United States Patent
Lineykin et al.

(10) Patent No.: US 11,616,181 B2
(45) Date of Patent: Mar. 28, 2023

(54) THERMOELECTRIC GENERATOR

(71) Applicant: Ariel Scientific Innovations Ltd., Ariel (IL)

(72) Inventors: Simon Lineykin, Beer-Sheva (IL); Alon Kuperman, Ashdod (IL)

(73) Assignee: Ariel Scientific Innovations Ltd., Ariel (IL)

( * ) Notice: Subject to any disclaimer, the term of this patent is extended or adjusted under 35 U.S.C. 154(b) by 681 days.

(21) Appl. No.: 16/309,467

(22) PCT Filed: Jun. 14, 2017

(86) PCT No.: PCT/IL2017/050661
§ 371 (c)(1),
(2) Date: Dec. 13, 2018

(87) PCT Pub. No.: WO2017/216797
PCT Pub. Date: Dec. 21, 2017

(65) Prior Publication Data
US 2020/0127184 A1    Apr. 23, 2020

Related U.S. Application Data

(60) Provisional application No. 62/349,738, filed on Jun. 14, 2016.

(51) Int. Cl.
*H01L 35/02* (2006.01)
*G06F 30/20* (2020.01)
(Continued)

(52) U.S. Cl.
CPC ............ *H01L 35/02* (2013.01); *G05F 1/67* (2013.01); *G06F 30/20* (2020.01); *H01L 35/32* (2013.01); *G06F 2119/06* (2020.01)

(58) Field of Classification Search
CPC ........ G05F 1/67; G06F 2119/06; G06F 30/20; H01L 35/02; H01L 35/28; H01L 35/32
(Continued)

(56) References Cited

U.S. PATENT DOCUMENTS 5,288,336 A    2/1994  Strachan et al.
5,817,188 A *  10/1998 Yahatz ................... H01L 35/10
                                                     136/237
(Continued)

FOREIGN PATENT DOCUMENTS

CN    106340583    1/2017
DE    10219970     11/2003
(Continued)

OTHER PUBLICATIONS

Translation of foreign Patent document JP 2014217250 A (Year: 2014).*
(Continued)

*Primary Examiner* — Alex W Mok

(57) ABSTRACT

A device for powering electronic devices comprises a thermoelectric generator (TEG) applied over a temperature gradient. A combination of feed forward and feed back control of the TEG unit allows for continued operation that is robust to reversal of the temperature gradient, for example over the duration of a diurnal cycle.

10 Claims, 18 Drawing Sheets
(10 of 18 Drawing Sheet(s) Filed in Color)

(51) Int. Cl.
  *H01L 35/32* (2006.01)
  *G05F 1/67* (2006.01)
  *G06F 119/06* (2020.01)
(58) Field of Classification Search
  USPC .......................................................... 310/306
  See application file for complete search history.

(56) References Cited

U.S. PATENT DOCUMENTS

| | | | | |
|---|---|---|---|---|
| 7,248,946 | B2* | 7/2007 | Bashaw | H02J 3/381 |
| | | | | 700/286 |
| 8,503,200 | B2* | 8/2013 | Chapman | H02J 3/381 |
| | | | | 363/41 |
| 8,982,592 | B2* | 3/2015 | Tan | G05F 1/67 |
| | | | | 363/95 |
| 9,059,363 | B2* | 6/2015 | McCann | H01L 35/26 |
| 9,154,032 | B1* | 10/2015 | Beijer | G05F 1/67 |
| 9,325,240 | B2* | 4/2016 | Calhoun | H02M 3/158 |
| 9,478,723 | B2* | 10/2016 | Fowler | H01L 35/30 |
| 2003/0192582 | A1* | 10/2003 | Guevara | H01L 35/30 |
| | | | | 136/205 |
| 2003/0211766 | A1 | 11/2003 | Krug | |
| 2005/0254191 | A1* | 11/2005 | Bashaw | H02J 3/381 |
| | | | | 361/62 |
| 2007/0241815 | A1* | 10/2007 | Noto | H03F 1/3276 |
| | | | | 330/149 |
| 2008/0271772 | A1* | 11/2008 | Leonov | G01J 5/12 |
| | | | | 136/224 |
| 2008/0314429 | A1* | 12/2008 | Leonov | H01L 35/30 |
| | | | | 136/201 |
| 2009/0293929 | A1* | 12/2009 | Leonov | H01L 35/32 |
| | | | | 136/201 |
| 2011/0273158 | A1* | 11/2011 | Mateu | H02M 3/156 |
| | | | | 323/303 |
| 2012/0085382 | A1* | 4/2012 | Sahin | H01L 35/32 |
| | | | | 136/205 |
| 2013/0027997 | A1* | 1/2013 | Tan | H02J 3/381 |
| | | | | 363/95 |
| 2013/0087180 | A1* | 4/2013 | Stark | H01L 35/30 |
| | | | | 136/205 |
| 2013/0199592 | A1* | 8/2013 | Hussain | H01L 35/16 |
| | | | | 136/206 |
| 2013/0206199 | A1* | 8/2013 | Lassiter | H01L 35/28 |
| | | | | 136/206 |
| 2014/0054969 | A1* | 2/2014 | Beijer | G05F 1/67 |
| | | | | 307/78 |
| 2014/0230874 | A1* | 8/2014 | Kushch | H01L 35/28 |
| | | | | 136/207 |
| 2014/0298811 | A1* | 10/2014 | McKay | F01N 5/025 |
| | | | | 60/645 |
| 2014/0305479 | A1* | 10/2014 | Nemir | H01L 35/32 |
| | | | | 136/203 |
| 2015/0207411 | A1* | 7/2015 | Calhoun | H02M 3/158 |
| | | | | 323/282 |
| 2015/0288187 | A1* | 10/2015 | Poitrast | H02J 7/00712 |
| | | | | 700/295 |
| 2016/0380174 | A1* | 12/2016 | Ghoshal | H01L 35/08 |
| | | | | 136/212 |

FOREIGN PATENT DOCUMENTS

| | | | | |
|---|---|---|---|---|
| EP | | 3093895 A1 * | 11/2016 | ............ H01L 35/30 |
| GB | | 2225161 | 5/1990 | |
| JP | | 2014-217250 | 11/2014 | |
| WO | WO 2017/216797 | | 12/2017 | |

OTHER PUBLICATIONS

Notification of Office Action and Search Report dated Jan. 6, 2020 From the National Intellectual Property Administration of the People's Republic of China Re. Application No. 201780049686.5 and Its Translation Into English. (39 Pages).
International Preliminary Report on Patentability dated Dec. 27, 2018 From the International Bureau of WIPO Re. Application No. PCT/IL2017/050661. (8 Pages).
International Search Report and the Written Opinion dated Sep. 19, 2017 From the International Searching Authority Re. Application No. PCT/IL2017/050661. (12 Pages).
Dousti et al. "Accurate Electrothermal Modeling of Thermoelectric Generators", Proceedings of the 2015 Design, Automation & Test in Europe Conference & Exhibition, Date 2015, Grenoble, France, Mar. 9-13, 2015, p. 1603-1606, Mar. 9, 2015.
Wertz et al. "Space Mission Analysis and Design", Aviation Industry Press, p. 273-283, Jan. 1992.
Notification of Office Action dated Feb. 3, 2021 From the State Intellectual Property Office of the People's Republic of China Re. Application No. 201780049686.5 and Its Translation Into English. (14 Pages).
Examination Report Under Sections 12 & 13 of the Patents Act, 1970 and the Patents Rules, 2003 dated Dec. 29, 2020 From the Government of India, Intellectual Property India, Patents, Designs, Trade Marks, Geographical Indications, The Patent Office Re. Application No. 2019927000915. (6 Pages).
Notification of Office Action and Search Report dated Aug. 27, 2020 From the State Intellectual Property Office of the People's Republic of China Re. Application No. 201780049686.5 and Its Translation Into English. (35 Pages).
Supplementary European Search Report and the European Search Opinion dated Nov. 22, 2019 From the European Patent Office Re. Application No. 17812888.0. (9 Pages).
Lineykin et al. "Analysis and Optimization of TEG-Heatsink Waste Energy Harvesting System for Low Temperature Gradients", 2014 16th European Conference on Power Electronics and Applications, XP032651316, Lappeenranta, Finland, Aug. 26-28, 2014, p. 1-10, Aug. 26, 2014.
Whalen et al. "Thermoelectric Energy Harvesting From Diurnal Heat Flow in the Upper Soil Layer", Energy Conversion and Management, XP055642916, 64: 397-402, Dec. 2012.
Office Action dated Aug. 1, 2021 From the Israel Patent Office Re. Application No. 163608 and Its Translation Into English. (6 Pages).

* cited by examiner

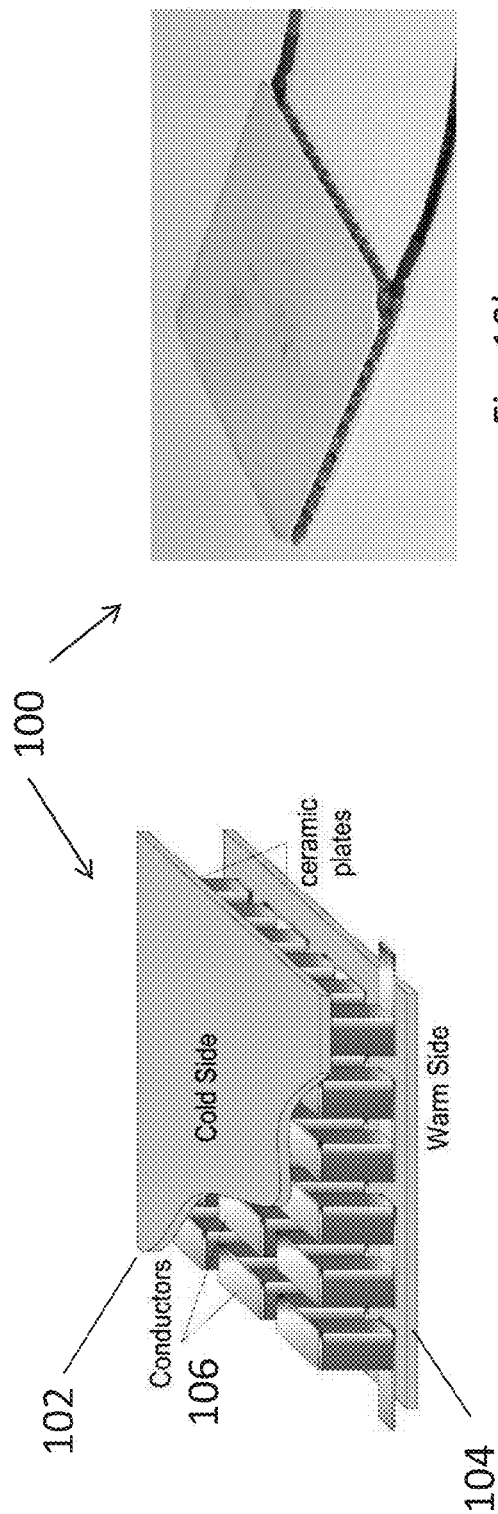
Fig. 10a
Fig. 10b
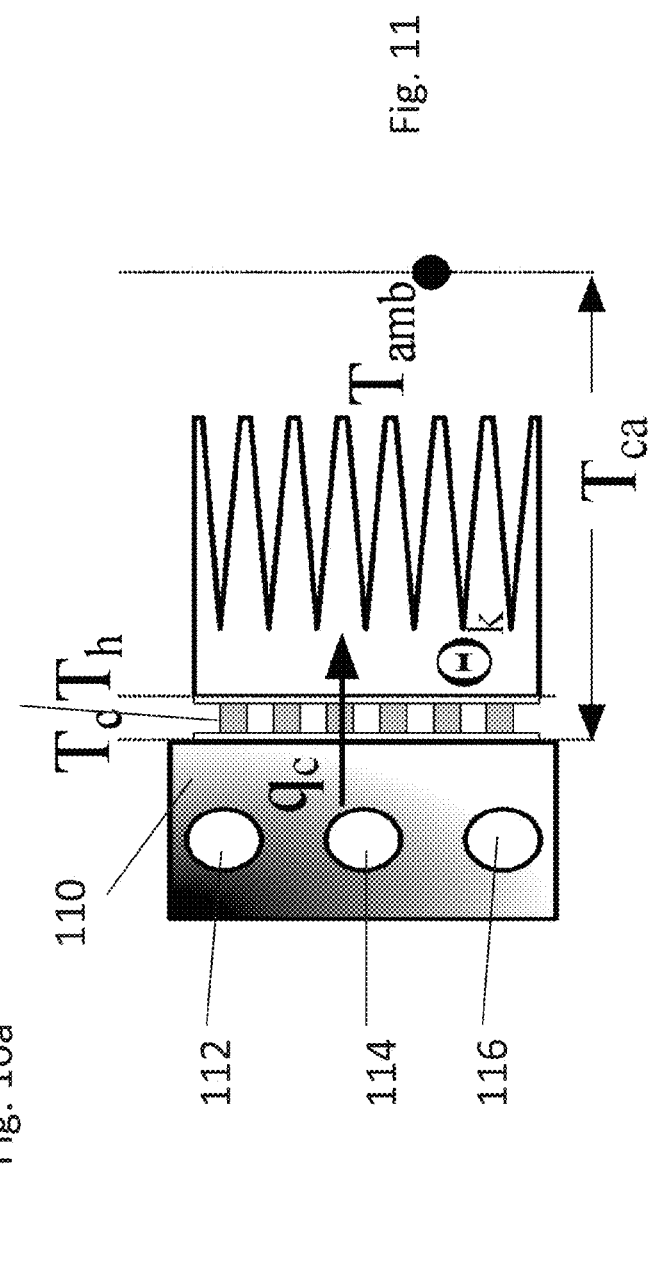
Fig. 11

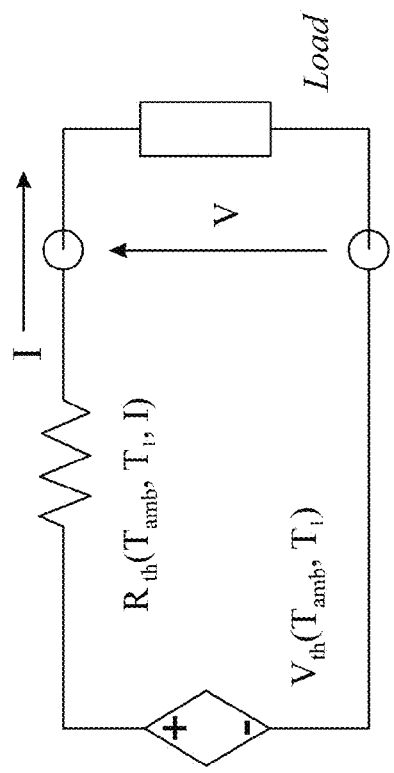
Fig. 17
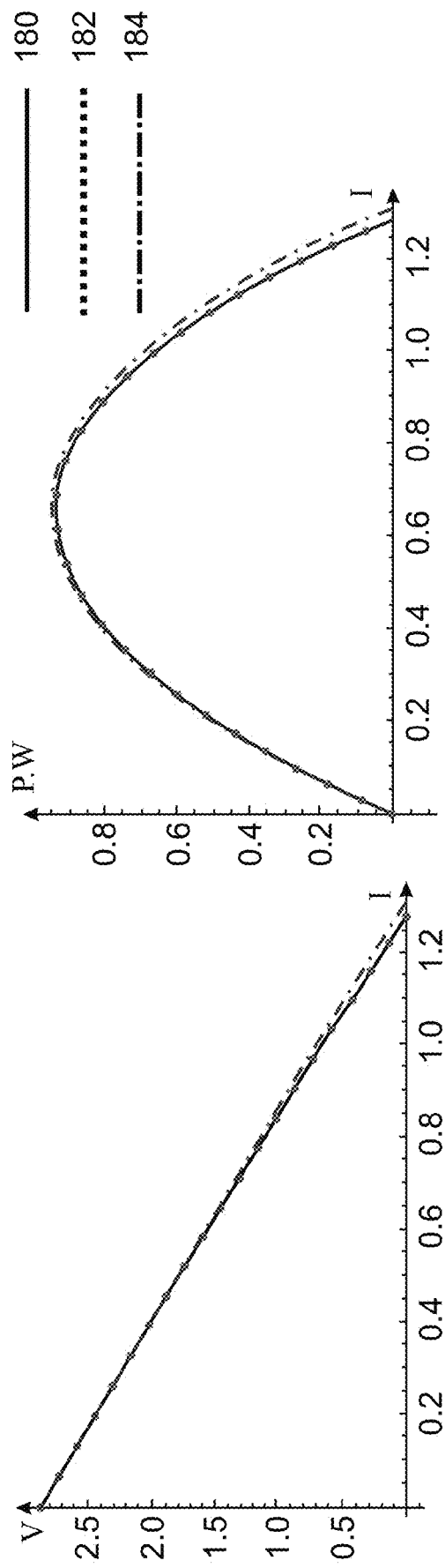
Fig. 18a
Fig. 18b

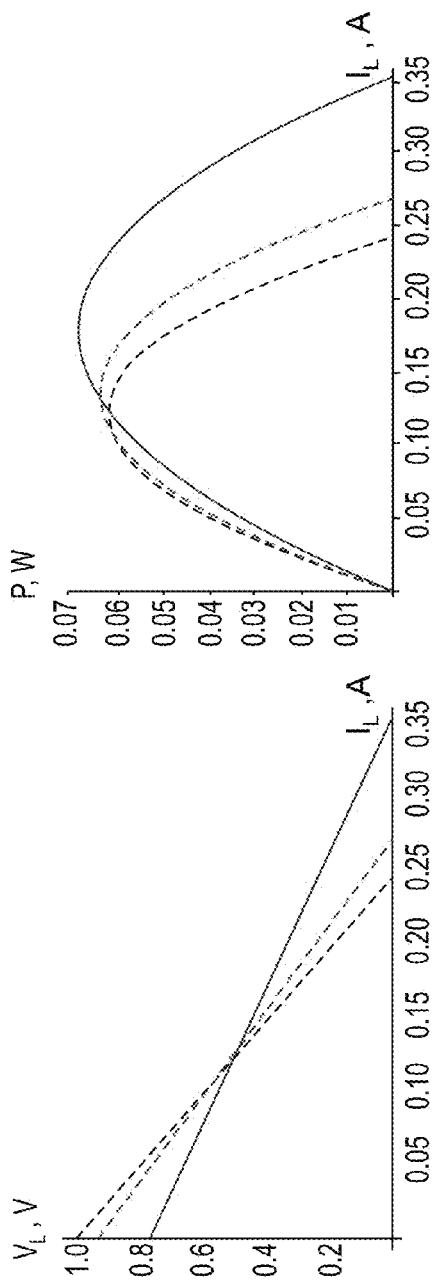
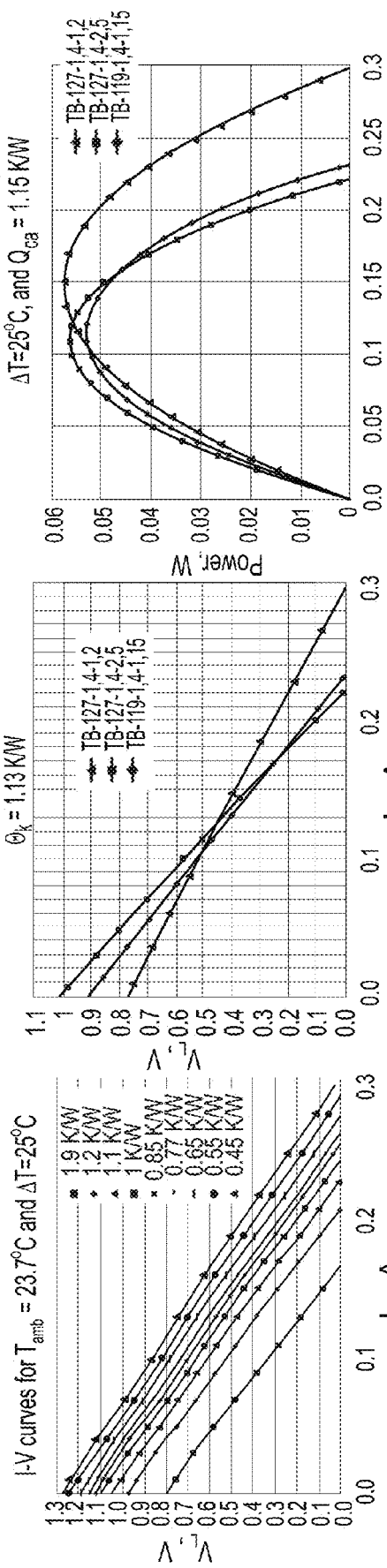

THERMOELECTRIC GENERATOR

RELATED APPLICATIONS

This application is a National Phase of PCT Patent Application No. PCT/IL2017/050661 having International filing date of Jun. 14, 2017, which claims the benefit of priority under 35 USC § 119(e) of U.S. Provisional Patent Application No. 62/349,738 filed on Jun. 14, 2016. The contents of the above applications are all incorporated by reference as if fully set forth herein in their entirety.

FIELD AND BACKGROUND OF THE INVENTION

The present invention, in some embodiments thereof, relates to thermoelectric generators.

The thermoelectric generator is based on the Seebeck effect. The Seebeck effect is the conversion of temperature differences directly into electricity. Seebeck discovered that a compass needle would be deflected when a closed loop was formed of two metals joined in two places with a temperature difference between the junctions. This is because the metals respond differently to the temperature difference, which creates a current loop, and thus produces a magnetic field. The effect is that a voltage, the thermoelectric EMF, is created in the presence of a temperature difference between two different metals or semiconductors, causing a continuous current in the conductors if they form a complete loop. The voltage created is of the order of several microvolts per kelvin. As shown in FIG. 1, $T_1$ and $T_2$ are hot and cold temperatures defining hot 10 and cold 12 junctions between materials of types A and B. The temperature gradient causes voltage V to appear between terminals 14 and 16.

Reference is now made to FIG. 2, which illustrates a hot water pipe 20. Surrounding the hot water pipe is a layer of thermo-electric generators (TEGs) 22 and heatsinks 24 connecting the TEGs to the ambient air. One can make an estimate of a quantity of energy available for harvesting when water travelling through the pipe sets up a temperature gradient with the ambient air. The diameter is large enough to assume that a small area of the pipe wall may be considered as a flat surface. In fact, a round to polyhedron interface can be inserted to provide good thermal contact.

We may also assume for coarse calculation that the heat transfer coefficient between the liquid and the wall is much higher than that between the wall and the ambient air. Just three to five years ago, harvesting milliwatts of power was considered pointless.

Nowadays however there are numerous devices such as sensors, which use very low power levels, and which could usefully be autonomous, meaning not dependent either on a nearby power grid or on manpower to replace batteries. Ultra-low power devices are a large sector of today's electronic equipment market, and power saving has also become an important issue. Numerous different types of devices, such as wireless sensors, alarms etc. use lithium cadmium batteries as a power source, and the working cycle of the batteries requires replacement every one or two years. The advantage of such devices is that they can operate in inaccessible places, but the main problem of using batteries is that somebody has to check and replace the batteries once every so often, thus making such devices far less economical and hence restricting their deployment.

A further problem with lithium cadmium batteries is that the batteries are not friendly to the environment, and are not easy to dispose of, especially in some of the locations where remote sensing away from a power grid is most needed.

A potential solution of the problem is to use an autonomic power source that is able to generate energy from environment. Harvesting of waste heat is a popular subject for research but one of the problems is to find a source that can be used most, if not all of the time. Solar power is only available when the sun is shining. Wind power is only available when the wind blows, and temperature gradients tend to reverse between day and night, making them difficult to tap.

Furthermore, solar power and wind power are both unavailable in enclosed locations such as tunnels, mines, cellars, and plumbing and sewerage installations. A conventionally constructed TEG layer over a hot pipe as in FIG. 2 is constructed for a temperature gradient in a given direction. In order to reverse the direction, a current bridge, DC to DC converter or like circuit is needed for power optimizing. An example is shown in FIG. 3, which shows a TEG element 30 connected to load 32 via control system 34, DC/DC converter 36 and capacitor 38.

The current bridge or like circuit is not, however efficient and cannot be used for circuits where the intended output is smaller than the Watt range. Yet, the average power consumption of a device that uses a 1000 mA-h Lithium Cadmium battery of 1.2V output voltage over the course of a year is in the range of about 140-200 µW.

Thus, not much power is required from an autonomic energy source to replace the battery or to charge a rechargeable battery and to last for the entire lifetime of the device. However, a suitable autonomic energy source that can provide low levels of power at anything approaching 100% of the time is not currently available.

SUMMARY OF THE INVENTION

The present embodiments may provide a method of utilization of heat flows between bodies of different heat capacity in a way that is configurable, suitable for low power levels of milliwatts and less, and operates over the course of a diurnal temperature cycle in the face of a reversal of the temperature gradient. The present embodiments may thus provide a device for powering electronic devices, which comprises a thermoelectric generator (TEG) unit applied over a temperature gradient.

A combination of feed forward and feed back control of the TEG unit allows for continued operation that is robust to reversal of the temperature gradient, for example over the duration of a diurnal cycle.

According to an aspect of some embodiments of the present invention there is provided a device for powering electronic devices comprising:

a thermoelectric generator unit comprising thermoelectric couples, the couples for connection across a temperature gradient brought about by different thermal properties of dissimilar materials;

the device configured with feed forward control of the thermoelectric generator unit and feed back control of the thermoelectric generator unit.

In an embodiment, the feed forward control is based on a steady state model.

In an embodiment, the feed forward and feedback control is configured to govern a current voltage characteristic of the array during a course of power generation.

An embodiment may comprise an energy storage unit configured to accumulate energy, thereby to allow powering of devices requiring short bursts of high power.

In an embodiment, the at least one unit comprises a plurality of thermoelectric generator elements, each element comprising a thermoelectric couple, the elements not being individually switchable.

In an embodiment, the controller is configured to correct for variations in internal resistance in the generator and provide impedance matching for a load.

An embodiment may be connected between two bodies of different material, the feedforward and feedback combining to provide generation over both halves of a diurnal cycle.

In an embodiment, the feed forward control is based on a static model and the feed back control corrects for errors in the static model based on system dynamics.

The device may be fitted between two locations having different thermal properties, thereby to extract energy from a source acting on the two locations.

In an embodiment, the source is a diurnal source, reversing direction over a diurnal cycle and the device is controllable to extract energy over both parts of the cycle.

According to a second aspect of the present invention there is provided a method of selecting TEG components for an active TEG array comprising:

modelling steady state electricity generation over a given temperature gradient using a linear approximation and a Thevenin model; and using results of the modelling to select components of the array.

In an embodiment, the Thevenin model is a two-pole type model comprising a voltage source and an internal resistance.

A thermoelectric generator may be included in the model, and the model may further comprise optimizing a thermal path.

The model may provide both an electrical path and the thermal path together using electrical circuit modelling software.

In an embodiment, selecting the components comprises selecting a TEG to correspond with a specified temperature gradient and a specified heat removal of the optimized thermal path.

The method may further comprise:

carrying out continuous measurement of a heat source temperature and an ambient temperature;

calculating an internal resistance value of a generator; and making corrections to match a load to the internal resistance value.

According to a third aspect of the present invention there is provided a method of powering an autonomous device comprising:

attaching to the autonomous device a TEG unit;

arranging the TEG unit across a temperature gradient;

using at least one of feed forward and feed back control to produce an electrical output for the autonomous device based on the temperature gradient over both parts of a diurnal cycle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks using hardware, software or firmware or by a combination thereof including using an operating system.

For example, hardware for performing selected tasks according to embodiments of the invention could be implemented as a chip or a circuit, and these are the embodiments discussed herein. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified schematic diagram of an existing thermoelectric generator (TEG);

FIG. 2 is a simplified diagram showing how TEGs can be fitted around a fluid pipe to use the fluid as a heat source;

FIG. 3 is a simplified diagram showing how the TEG of FIG. 1 is included with a control system to power a load;

FIG. 4 is a simplified diagram showing a switchable TEG array connected to power a load in accordance with a first embodiment of the present invention;

Figure 5A:
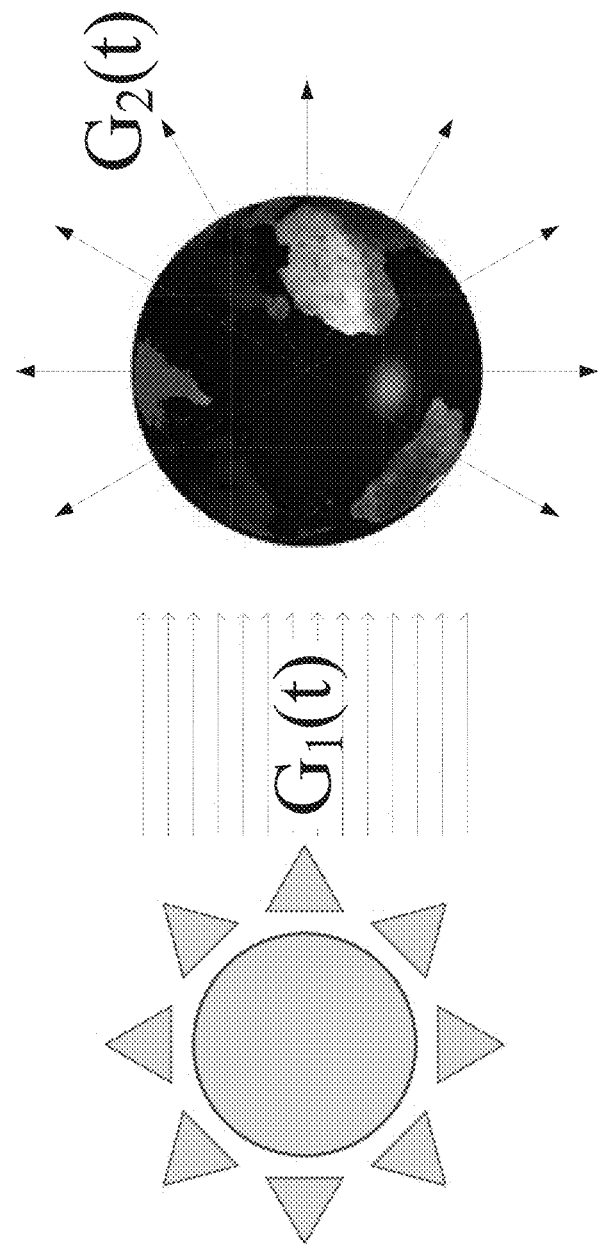
Figure 5B:
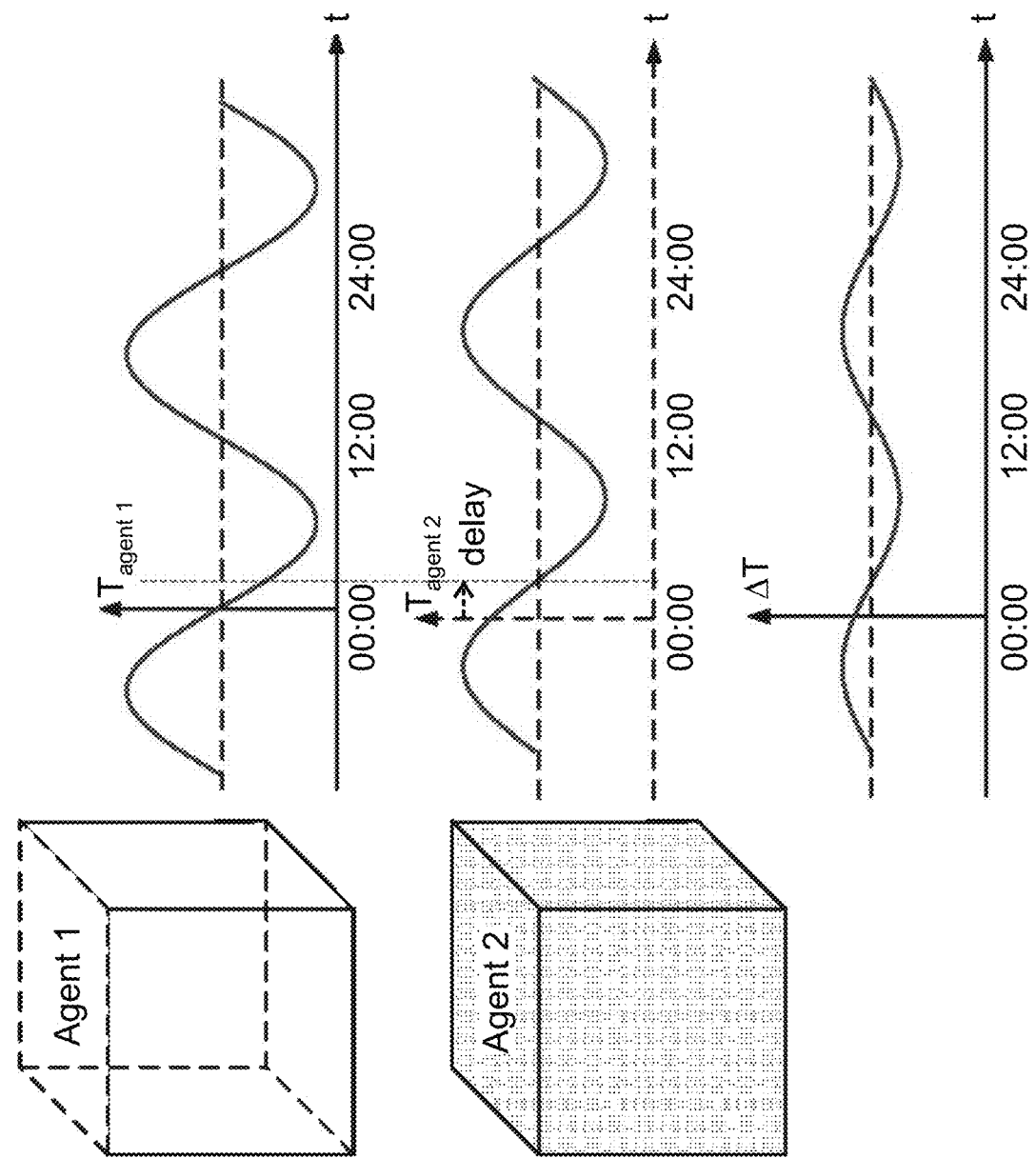
Figure 6:
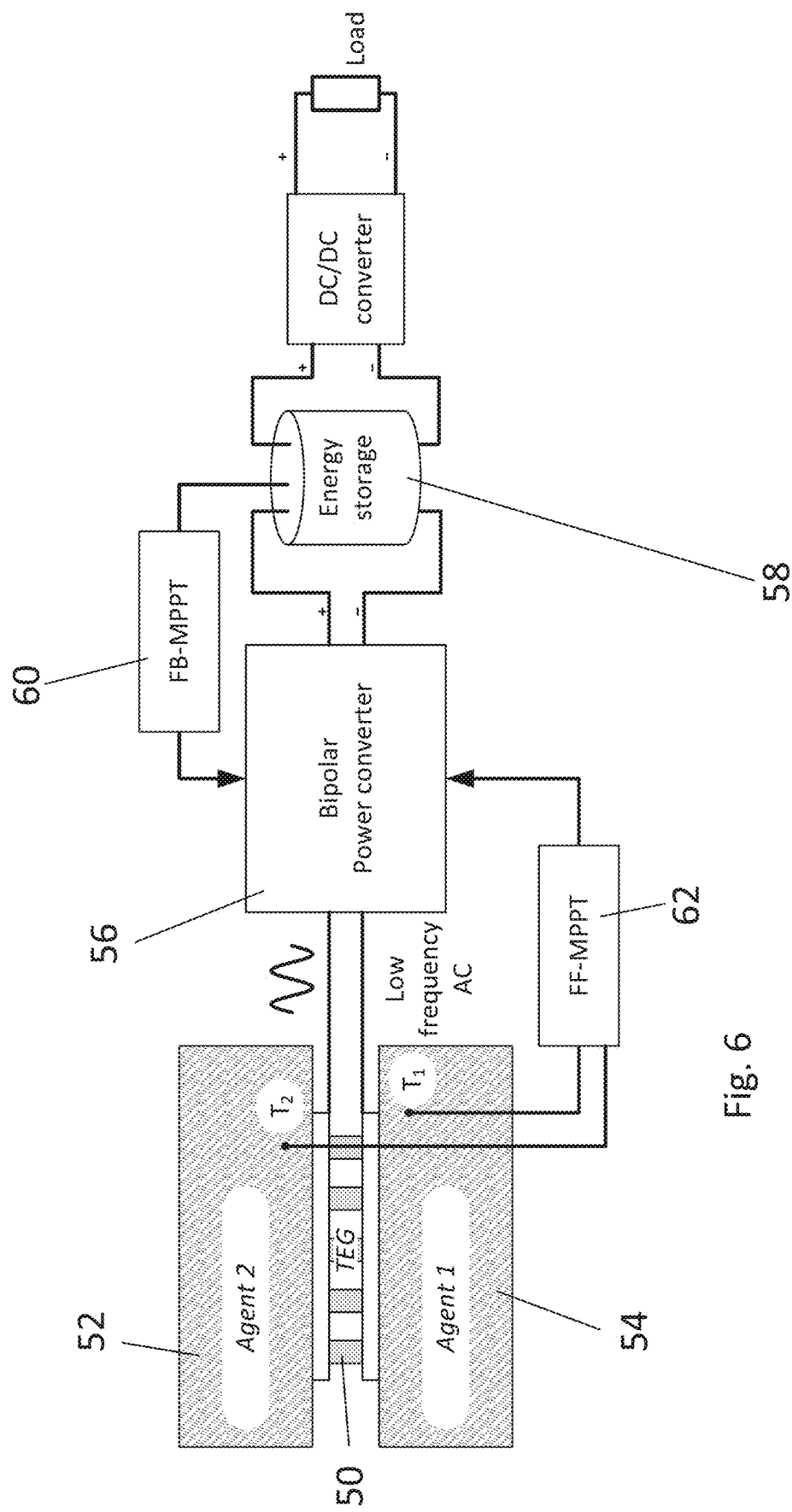
Figure 7:
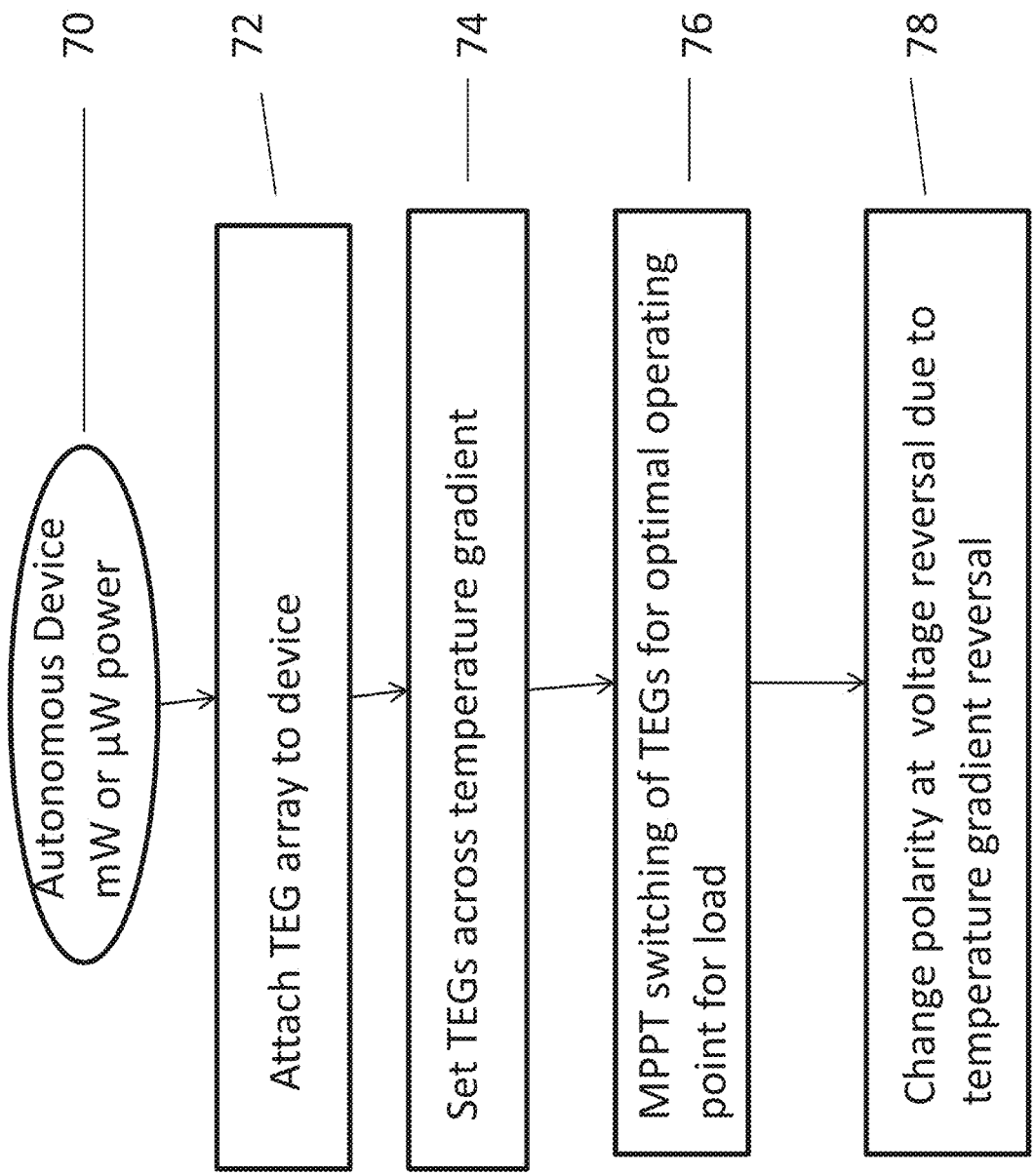
Figure 8:
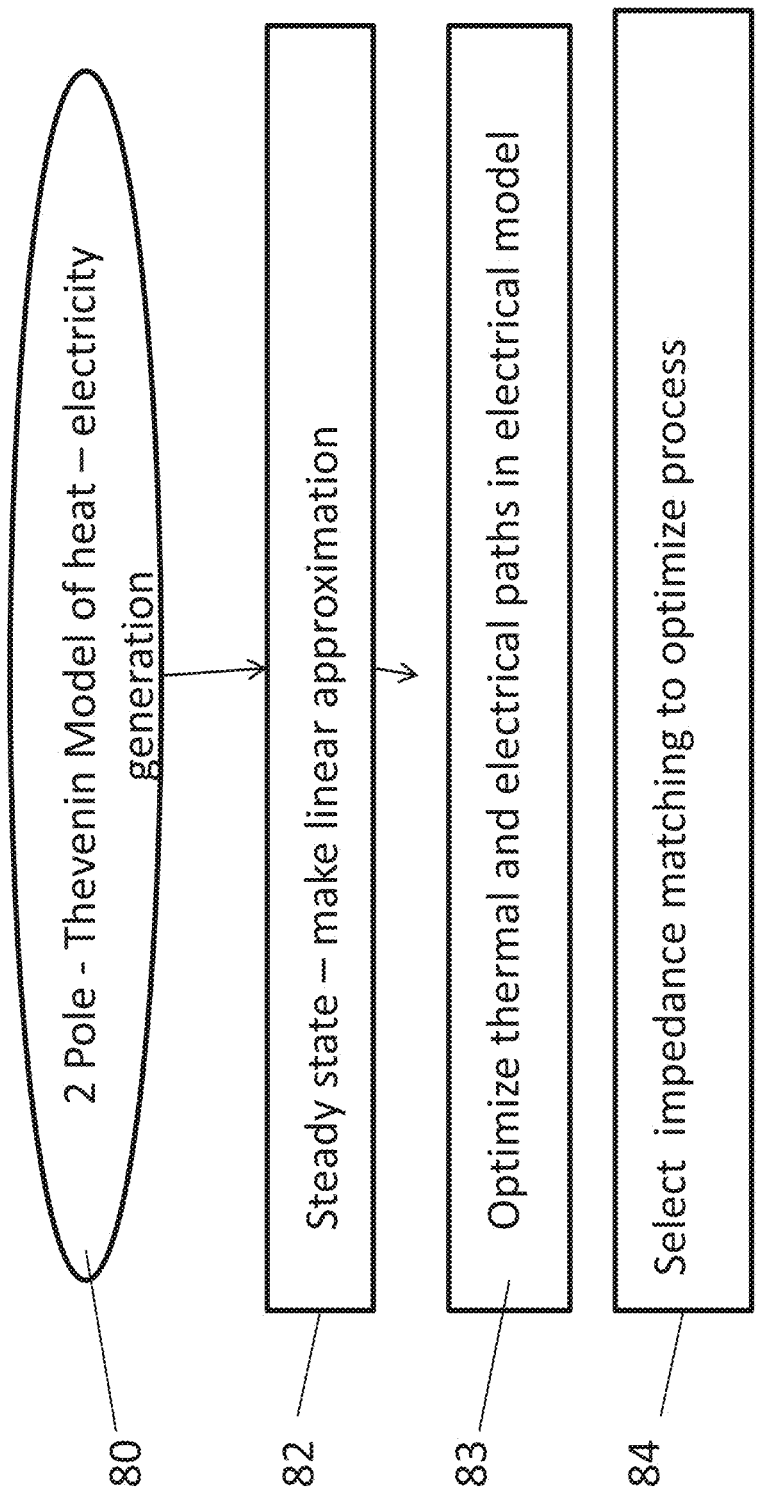
Figure 9:
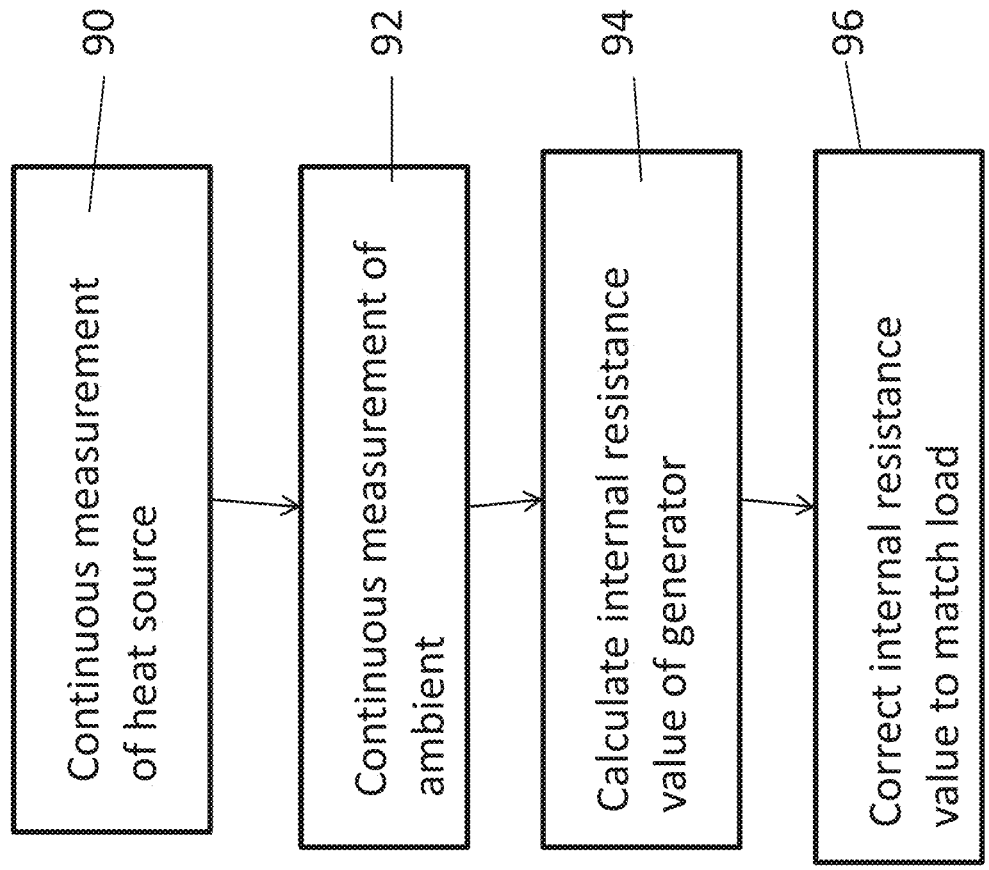
Figure 12:
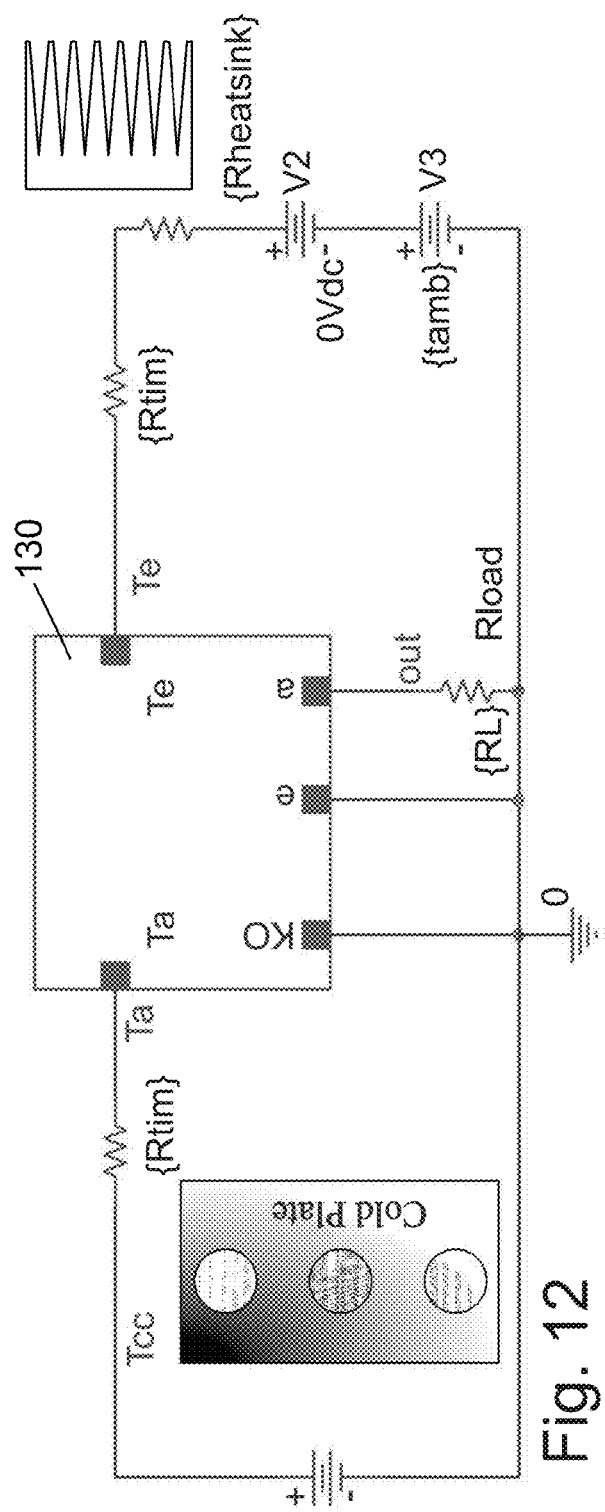
Figure 13A:
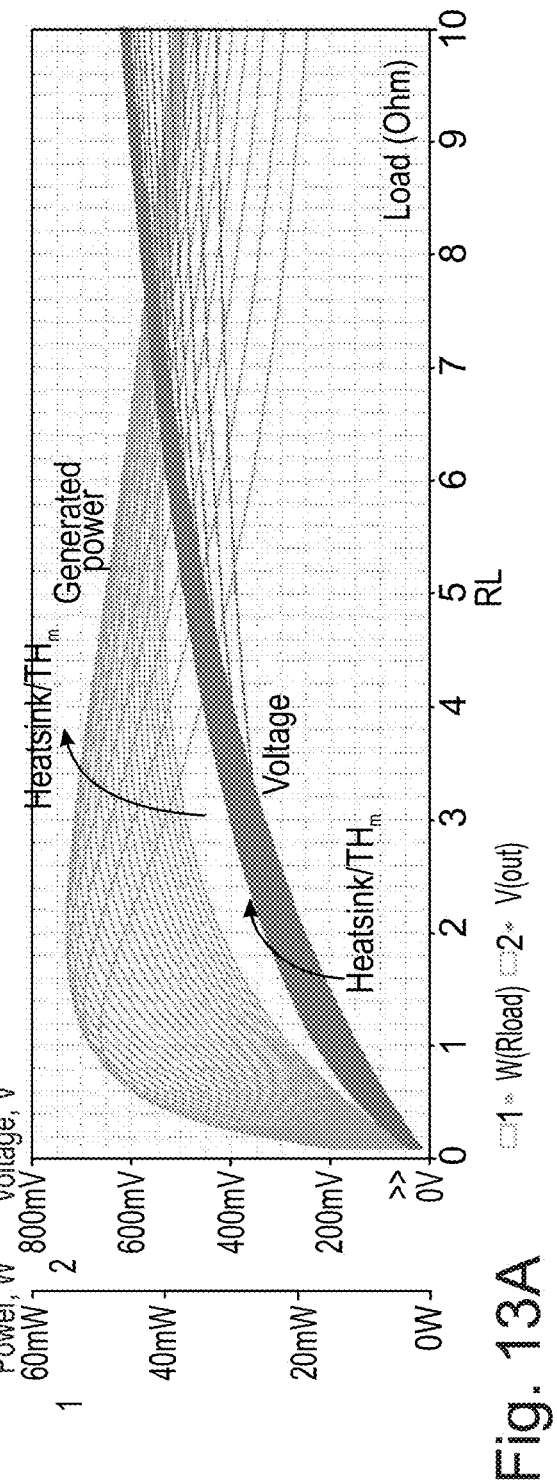
Figure 13B:
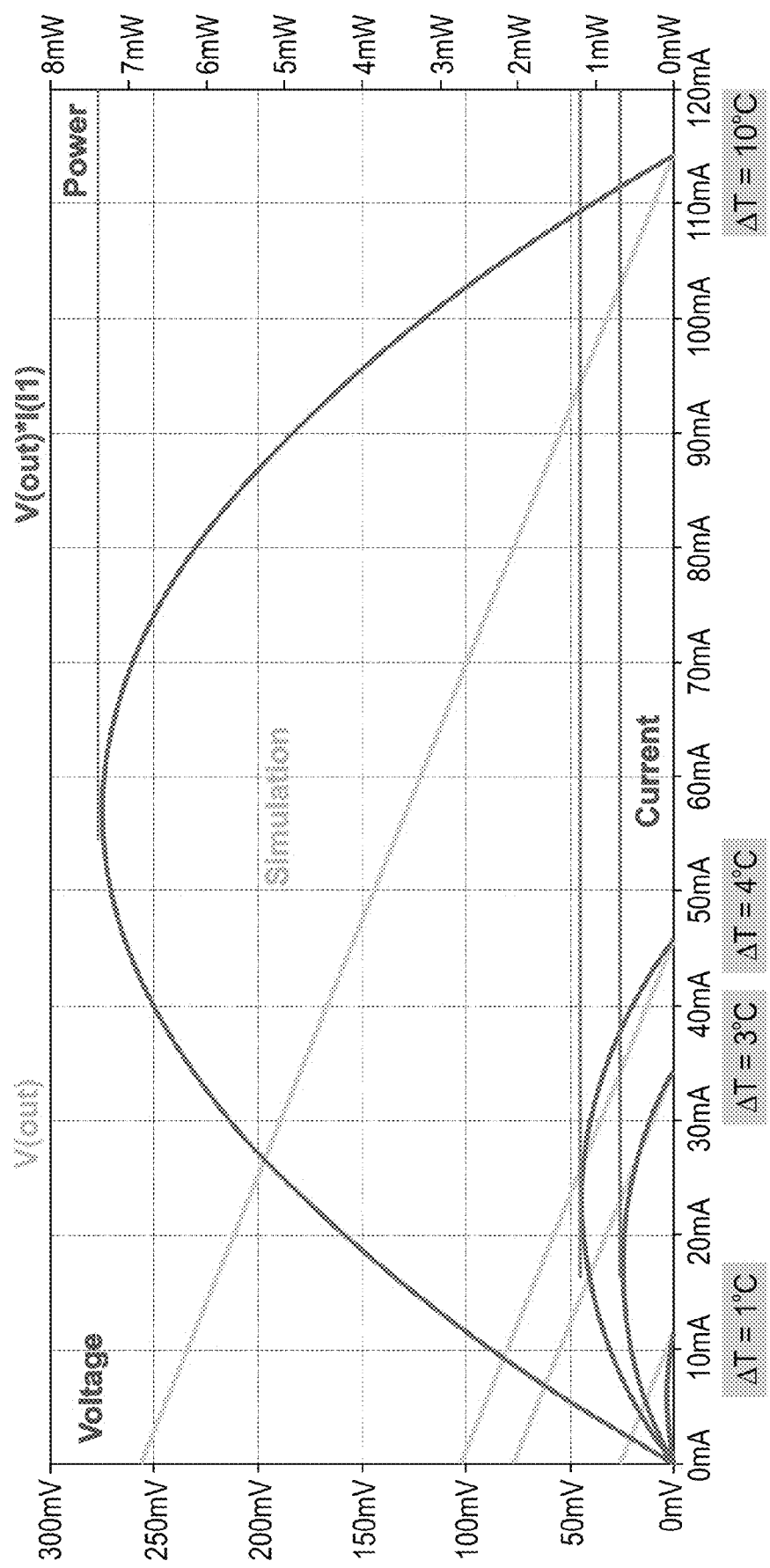
Figure 15:
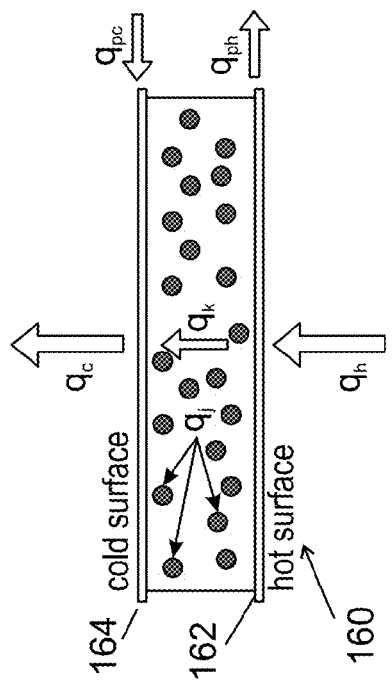
Figure 14:
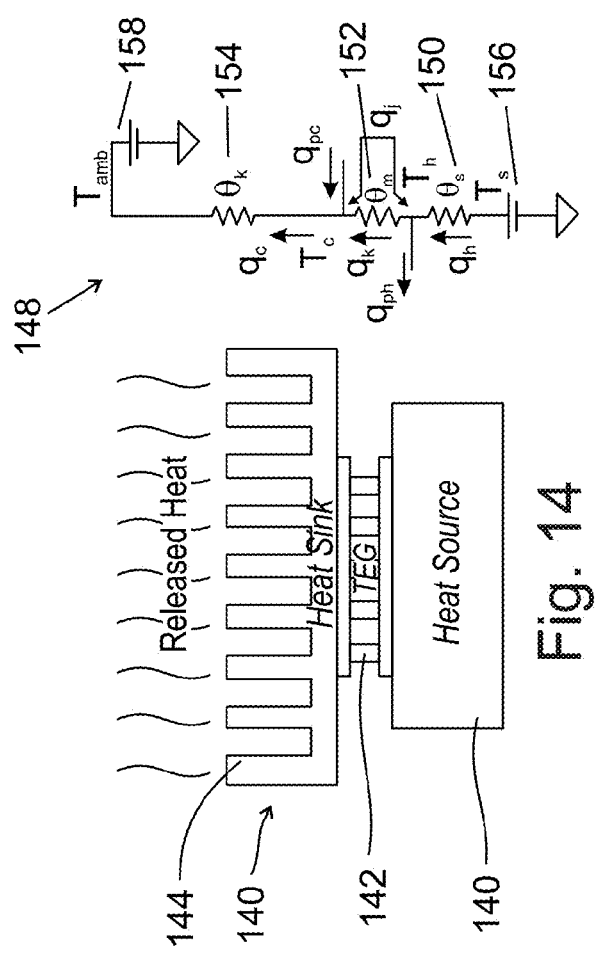
Figure 16:
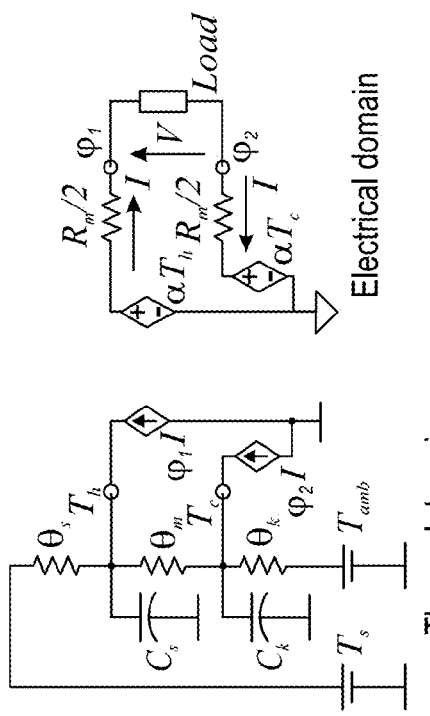
Figures 21, 22:
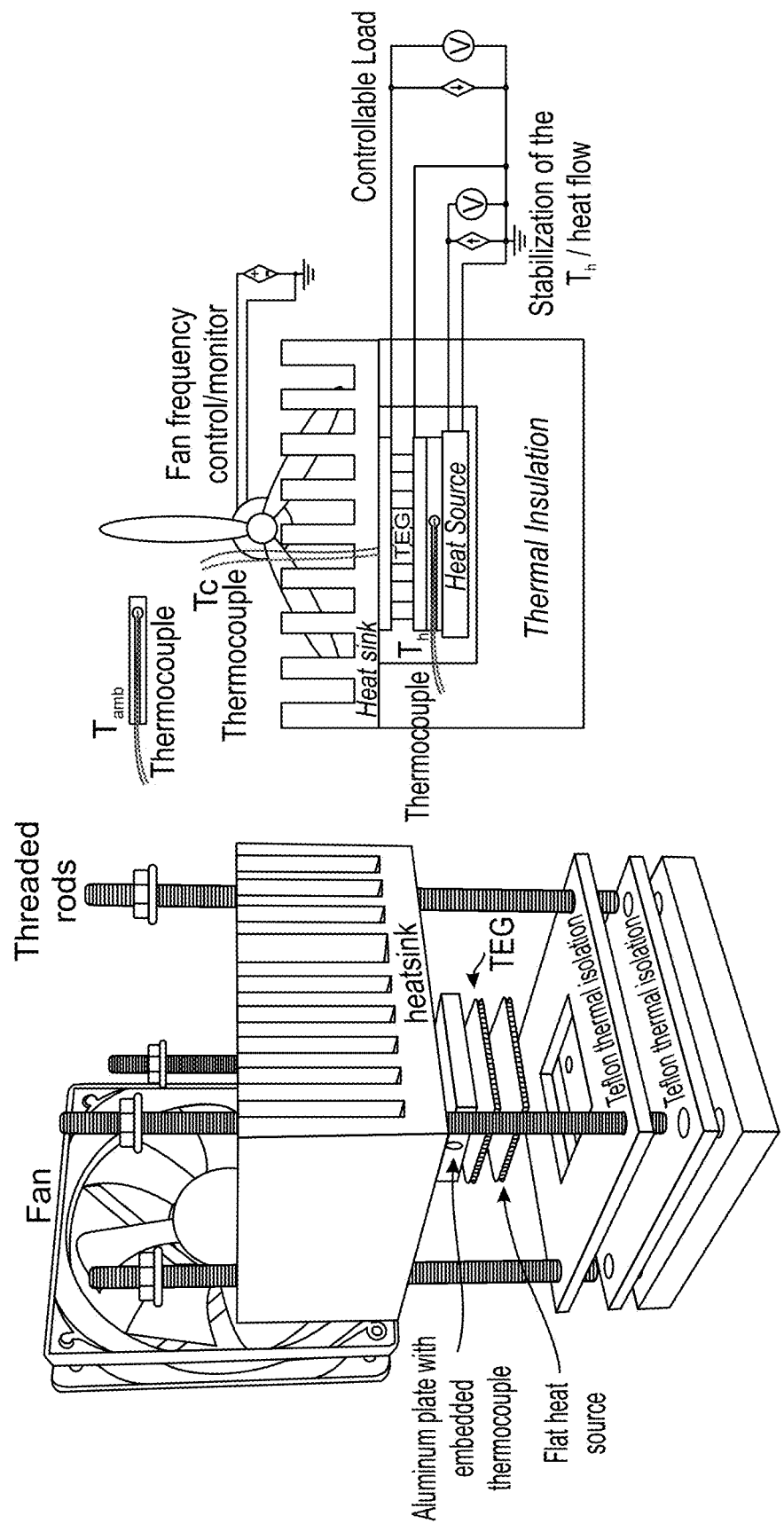
Figure 23:
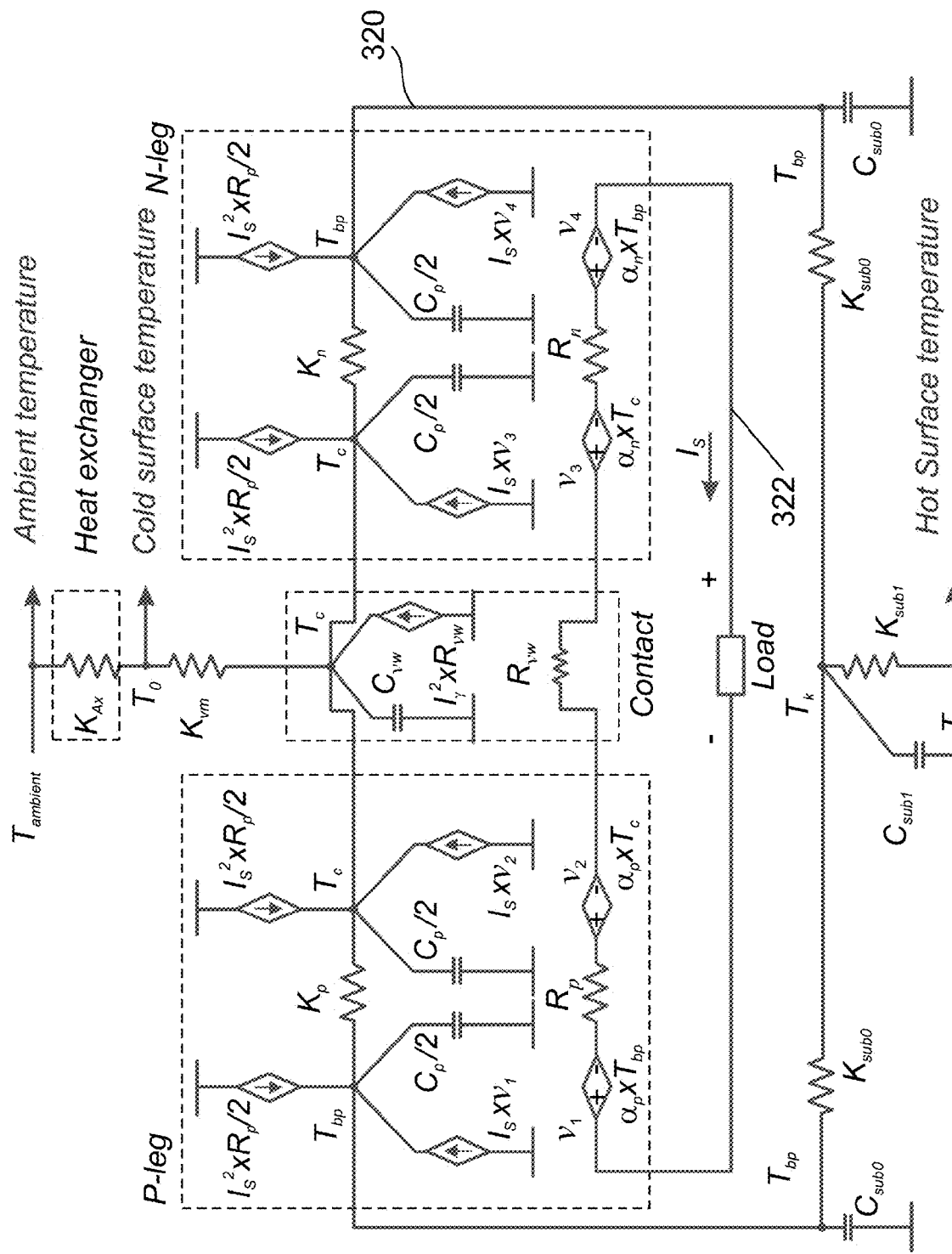
Figure 24:
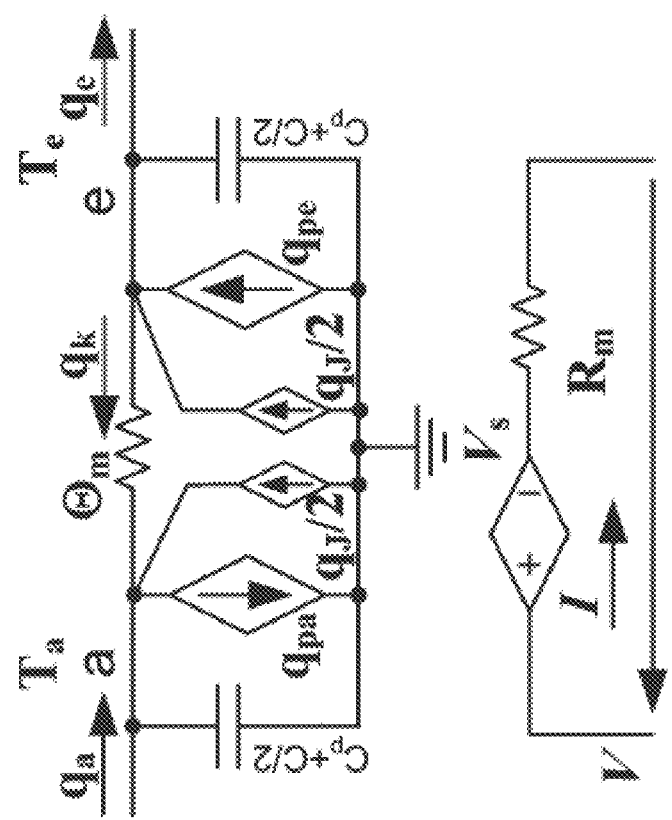

FIG. 5*a* is a simplified diagram illustrating a diurnal cycle;

FIG. 5*b* is a simplified diagram showing energy flow during the diurnal cycle of FIG. 5*a* between two bodies having different heat capacity or time constants, meaning heat capacity over heat conduction ratios;

FIG. 6 is a simplified diagram illustrating an embodiment of the present invention in which a TEG is connected between two bodies to generate power using a temperature gradient over both parts of the diurnal cycle of FIG. 5*b*;

FIG. 7 is a simplified flow chart illustrating a procedure according to an embodiment of the present invention for using an actively switched TEG array that takes account of reversal of the temperature gradient;

FIG. 8 is a simplified flow chart illustrating a process of modeling the TEG array in order to select optimal components, according to an embodiment of the present invention;

FIG. 9 is a simplified flow chart showing how the procedure of FIG. 8 may be extended to correct the TEG internal resistance to match the load;

FIG. 10*a* is a simplified cutaway perspective view of a TEG array;

FIG. 10*b* is a view of a TEG array component;

FIG. 11 is a simplified view showing heat flow through a TEG array component;

FIG. 12 is a simplified simulation scheme for modeling the TEG array heat flow of FIG. 11 as electrical components, according to an embodiment of the present invention;

FIG. 13a is a simplified graph illustrating results from an $R_L$ (load resistance) sweep of the model and showing Power/Voltage curves over load ranges for 5° C. temperature difference, between the air and the heat source;

FIG. 13b is a simplified graph showing power and voltage curves against current for different temperatures;

FIG. 14 is a simplified schematic diagram illustrating a conventional thermoelectric system comprising a heat source, a TEG, and a heat sink; and showing alongside an equivalent circuit visualization of heat flow between the temperature T of the heat source and the ambient temperature at steady state conditions according to an embodiment of the present invention;

FIG. 15 illustrates the TEG of FIG. 14 as a homogeneous solid body having heat conductivity in one dimension only, from hot to cold surfaces, and showing heat flows through the body due to Fourier heat transfer;

FIG. 16 is a simplified diagram showing an equivalent circuit of the TEG for both thermal and electrical domains, according to an embodiment of the present invention;

FIG. 17 is a simplified schematic diagram showing a two-terminal Thévenin-type equivalent circuit of the TEG connected to a load;

FIGS. 18a and 18b are simplified graphs illustrating examples of V-I (a) and P-I (b) curves for a specific TEG;

FIGS. 19a and 19b show the V-I and P-I characteristics respectively of the selected module in solid line, alongside characteristics of two others, whose thermal resistance is larger than optimal in one case and smaller than optimal in the other case;

FIGS. 20a, 20b and 20c show examples of experimentally measured curves, (a) shows I-V curves of a TEG for given $\Delta T$ and Tamb and variable values of the thermal resistance of the heatsink, (b) shows I-V curves for known $\Delta T$, Tamb, and $\Theta$ca, for different TEGs, and (c) shows P-I curves for known $\Delta T$, Tamb, and $\Theta$ca for different TEGs;

FIG. 21 is a simplified diagram showing an experimental TEG array and control system powering a load according to an embodiment of the present invention;

FIG. 22 illustrates the control and measurement arrangement for the TEG array of FIG. 21;

FIG. 23 is a simplified diagram illustrating an equivalent electrical circuit, according to the present embodiments of a single-TEG, in which bold lines indicate the thermal part of the model, and continuous non-bold lines indicate the electrical part of the model; and FIG. 24 is a simplified model of a TEG in which the thermal resistance and thermal capacitance of the TEM, as well as the thermal capacitance of attached ceramic plates are represented as lumped elements.

DESCRIPTION OF SPECIFIC EMBODIMENTS OF THE INVENTION

The present invention, in some embodiments thereof, relates to electricity generation from a temperature gradient that is resilient to changes and even reversals of that temperature gradient.

Power levels of 140-200 μW over an area of 16-25 cm² the standard area of a single TE module, are available in a wide range of places and can be harvested by direct energy conversion. Such a proposition is based on previous experience on studies of thermoelectric devices but problems have been experienced in attempting to achieve direct energy conversion. The present embodiments provide an improvement in existing systems, which allows generation of an amount of energy close to the theoretical maximum.

The present embodiments may further provide a way of choosing an optimal thermoelectric module for low temperature differences, matching thermal resistances of the module and heat exchangers, design of a power saving and efficient converter, and finding criteria and an algorithm for maximum power point tracking. The resulting thermoelectric module may be incorporated into ultra low voltage technologies such as autonomous sensors and are particularly suitable for sensors in remote locations, and sensors operating according to the Zigbee protocol, for example forming micronetworks as part of the Internet of things.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
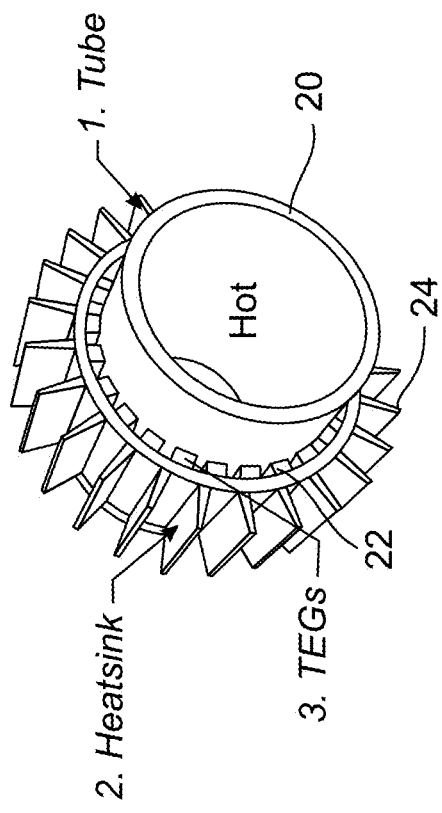
Figure 1:
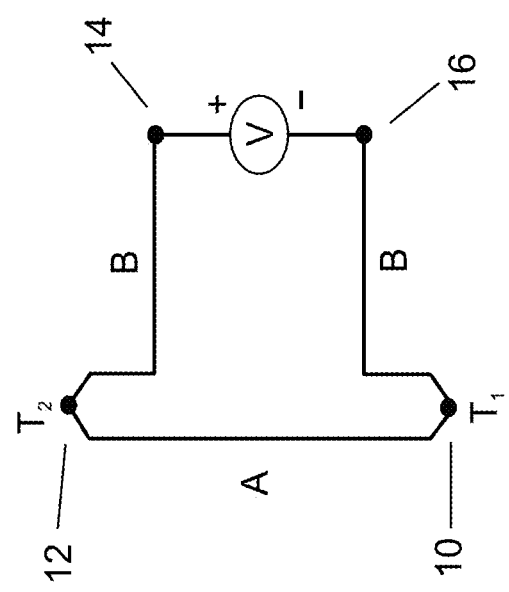
Figure 3:
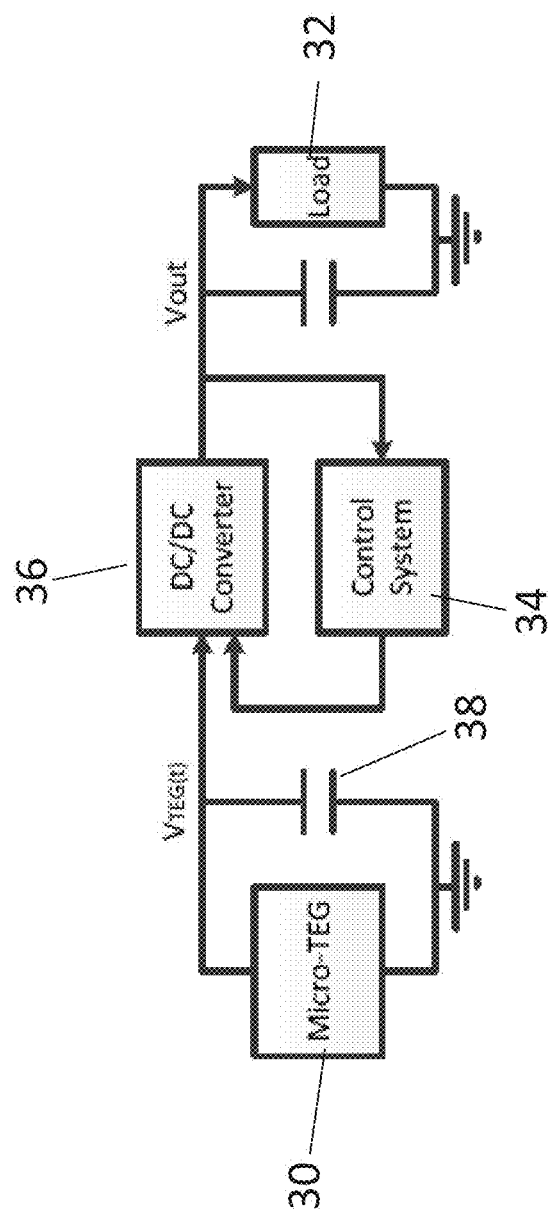

Referring now to the drawings, FIGS. 1 to 3 are as discussed in the background.

Figure 4:
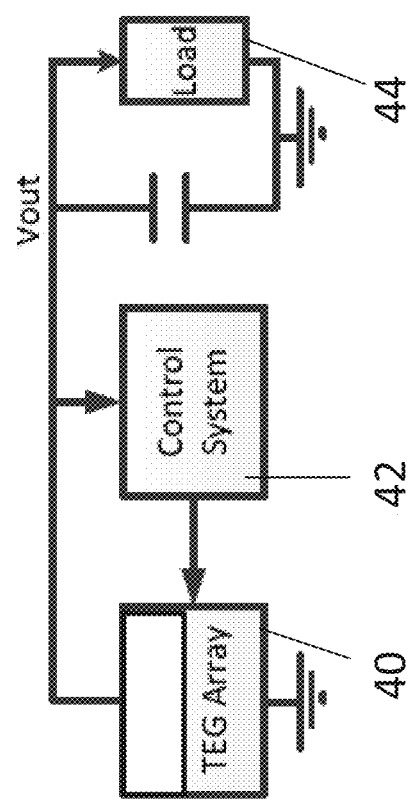

Reference is now made to FIG. 4, which shows a thermoelectric generator (TEG) array 40 which is connected to control system 42, and powers a load 44.

The array may simply be constructed by combining multiple TEG elements.

Alternatively, the array can usefully be constructed as an integrated circuit, for example in CMOS-technology. Other suitable technologies may include mono and poly-crystalline, MEMS, thin-film and organic thermoelectric technologies and additional technologies are expected to become available in the next few years. The TEG elements themselves can be constructed in CMOS-technology together with the control system which may be provided on the same chip, and the commutation system, and with DC/DC converter. The needed value of the output voltage can be also achieved by controlled re-commutation of groups of TEGs to avoid usage in inductors or like elements. A control system provides the array with resilience to changes and even reversals of the temperature gradient.

The controller 34 may provide a combination of feed forward and feed back control as will be described in greater detail below, so that it is possible to use the TEG array to supply milliwatt and microwatt scale loads at all times of the day despite the temperature gradient being subjected to the diurnal cycle.

The controller may additionally but not necessarily switch the units between serial and parallel electrical configurations, or may short out one or more of the rows, for example to obtain different operating points.

Reference is now made to FIGS. 5a-b, which illustrates the diurnal cycle including heating during daylight and cooling at night. The heating and cooling are represented by ingoing ($G_1(t)$) and outgoing ($G_2(t)$) radiation heat exchange processes.

During daytime, the source of incoming energy towards the earth's surface and atmosphere is Solar radiation. At night time energy leaves the earth's surface and atmosphere due to outgoing radiation to space. As result, the average temperature of any local area of the earth varies reciprocally with period of 24 hours.

Reference is now made to FIG. 6, which depicts a temperature gradient between two agents having a common surface. The gradient may be of positive or negative direction and exists almost throughout the diurnal cycle. The value of the gradient is low, sometimes just a couple of Kelvin, but heat that flows between the agents due to the gradient may add up to hundreds of milliwatts per square centimeter, depending on the heat exchange coefficient between the agents. The energy can be partially extracted, converted into electrical energy, stored, and used as an autonomic power supply for low power electronic devices, such as active sensors, wireless transmitters, etc. The average power supplied to the load device has to be less than or equal to the average power harvested from the thermal source and stored in the energy storage unit.

A possible way of harvesting of thermal energy is harvesting by means of thermoelectric power generator (TEG). The TEG is a device providing direct energy conversion from thermal energy to electrical energy, as discussed above.

Reference is now made to FIG. 6, which is an exemplary scheme of an alternating temperature gradient energy harvester. A TEG 50 is sandwiched between two agents 52 and 54 with different thermal properties to generate a low-frequency AC voltage. A bipolar converter 56 provides optimal impedance matching with TEG 50 and supplies DC electrical energy to energy storage 58.

The present embodiments place the TEG 50 as a thermal contact surface between the two agents 52 and 54. The TEG 50 generates an alternating voltage with a very long period of 24 hrs due to the diurnal cycle. The bipolar power converter 56 is necessary to harvest the electrical energy and store it in the storage unit 58 which may be an ultracapacitor, or accumulator of another type. The bipolar power converter 56 may maximize power flow from the TEG 50 to the storage 58.

Maximum power point tracking (MPPT) algorithms 60 are used to provide such a maximal flow. Taking into account that all dynamic processes have long response times due to the relatively large thermal masses of the agents, a feed-forward (FF-MPPT) 62 algorithm may be employed. The FF-MPPT takes into account temperature conditions of the thermal sources and calculates, using a model which is discussed in greater detail below, the optimal operational point for maximal flow conditions. The feedback (FB-MPPT) algorithm corrects the error of the FF-MPPT and finds the exact power point by maximization of the output power.

The first, feedback algorithm FB-MPPT may be used to maximize the power using a standard model of the TEG.

The standard model takes into account five main processes taking place in the TEG, which are now discussed.

The five main physical processes that take place in a thermoelectric module are: Thermal convection—the phenomenon referred to as the Fourier process, described by a physical constant k (Wm$^{-1}$K$^{-1}$), which is determined by the thermal conductivity and geometry of the pellet.

The equation of heat transfer in a pellet is:

$$q = -kA\frac{\partial T}{\partial x} \approx -k\frac{A}{L}\Delta T = -\frac{\Delta T}{2\Theta} \quad (1)$$

where x is distance along the heat flow path, L/A is a geometry factor, L—height of the pellet (m), A—cross-section area of the pellet (m$^2$), T—temperature (K), and q—heat (W). $\Theta$(K W$^{-1}$) is the thermal resistance of the couple of pellets may be expressed as:

$$\Theta = \frac{1}{k}\frac{L}{2A} \quad (2)$$

The total thermal resistance of the N couples of a module, which are connected thermally in parallel, may be:

$$\Theta_m = \Theta/N \quad (3)$$

Joule heating is the physical process of heat dissipation in the resistive elements. The electrical resistance R of a couple of pellets is:

$$R = \rho\frac{2L}{A} \quad (4)$$

$$q_j = I^2 R_m \quad (5)$$

where $\rho$—resistivity of the material in Ohms per meter, $q_j$—Joule heating of TEM (W), I—electric current (A), and $R_m$ is the total resistance of the TEM with N-couples.

$$R_m = R \cdot N \quad (6)$$

The Seebeck power generation is a process by which heating (or cooling) of the junction of two dissimilar materials generates an electrical potential across the junction. The emf (U) of the TEM may be expressed as:

$$U = \alpha_m(T_a - T_e) \quad (7)$$

where $\alpha$(V K$^{-1}$) is the Seebeck coefficient corresponding to a specific pair of materials. The subscripts (a) and (e) define the temperature of the heat-absorbing surface and heat emitting surface correspondently. The $T_{a/e}$ is the temperature of the corresponding junctions. For TEG, composed of N couples connected in series, the equivalent Seebeck coefficient $\alpha_m$ can be used:

$$\alpha_m = \alpha N \quad (8)$$

Peltier cooling/heating—is the phenomenon of pumping from absorbing to emitting sides due to current through the TEG. The heat $q_{pa/pe}$ is absorbed/emitted by the TEG at corresponding sides is:

$$q_{pa/pe} = \alpha_m T_{a/e} I \quad (9)$$

The Peltier cooling/heating $q_{pa/pe}$ is sensitive to current direction, thus half of the TEG's junctions, that conduct the current in positive direction (from material of p-type to material of n-type) will absorb the heat whereas the other half, where current flows in the opposite direction, will release heat.

An additional thermoelectric phenomenon—the Thompson phenomenon, is described by the Thompson coefficient $\tau = d\alpha/dT$ (V K$^{-2}$). The effect of this phenomenon is small and is therefore usually neglected.

The two terminal/two-pole equivalent electrical circuit model, which may be regarded as the designer friendly model of the TEG is discussed hereinbelow in respect of FIG. 17 wherein is provided a modified tri-port model of the TEG for low temperature applications.

The simplified scheme for system "solid heat source—Air" is shown in FIG. 17. The output resistance of the TEG, which is just slightly non-linear, depends both on temperatures of the hot and cold sides, on the temperature difference, and on outgoing load current, not just on ohmic resistance of the TEG.

Two-terminal (two-pole) Thévenin-type equivalent circuit of the TEG with equipment.

A way of choosing an optimal TEG for specific application from manufacturer's stock is discussed hereinbelow. Following the calculations, the maximum power that is available for harvesting where the optimal TEG is in use is:

$$P_{max} = \frac{\Delta T \cdot Z}{4 \cdot \left(2 \cdot \left(1 + \sqrt{1 + \Delta T \cdot Z + T_{amb} \cdot Z}\right) + T_{amb} \cdot Z\right)} \cdot q^* \quad (10)$$

where $\Delta T$ is an available temperature gradient, although not the same as the temperature gradient over the module as a whole, Z is a figure of merit for the thermoelectric material used in the TEG, and q* is the amount of thermal energy for a given gradient and heat exchanger. Equation 11 is only valid in the case of thermal and electrical optimization. In equation 11:

$$q^* = \frac{\Delta T}{\Theta_k}, [W] \quad (11)$$

Reference is now made to FIG. 7, which is a simplified flow chart illustrating deployment of a TEG array to power an autonomous device. The autonomous device 70 is attached 72 to the TEG array, which is set across a temperature gradient 74. The temperature gradient may be any temperature gradient that may be present in proximity to the deployment of the autonomous device. Due to the small power levels needed the gradient may be very small.

During deployment the TEG array may be actively switched 76 to produce an electrical output for the autonomous device based on the temperature gradient, the required load and an optimal operating point. Now many temperature gradients may reverse, say as day turns to night and vice versa, so the control, using feed forward and feedback control, can provide the TEG array with sufficient resilience for the reversal so that the array can continue to power the device.

Reference is now made to FIG. 8 which illustrates a method 80 of selecting TEG components for a TEG array, based on modelling the electricity generation process, modelling steady state electricity generation over a given temperature gradient.

The method may use 82 a linear approximation, and model the steady state using a Thevenin model, for example a two-pole Thevenin model. The model incorporates both thermal and electrical aspects together as electrical components, and in box 83 optimizes both the thermal and electrical paths by providing parameters to the model components. In box 84, the model is used to select real world components which are compatible with the parameters of the model, to optimize the process.

The Thevenin model may be a two-pole type model comprising a voltage source and an internal resistance, as will be discussed in greater detail below, and may include a thermoelectric generator as a model component.

The method may be used to find an optimal thermal path, and the selecting of components may involve selecting a TEG to correspond with a specified temperature gradient and a specified heat removal of the optimized thermal path. Like considerations may be applied to the electrical path. The method combines feed forward and feed back in such a way that feed forward guides the parameters for feedback to correct the errors and give rapid convergence.

Reference is now made to FIG. 9, which is a simplified diagram illustrating the feed forward part of the model process in FIG. 8 to achieve dynamic resistance matching to a load and provide the resistance parameters for the feedback control. In the known art the only way of matching the internal resistance to the load is based on continuous measurement, which adds complexity and inefficiency to the circuit.

The present model allows for the internal resistance to be calculated instead. As shown in FIG. 9, the ambient temperature and the heat source are continuously measured 90, 92, and used as inputs to the model. The model calculates the internal resistance of the generator 94 and the internal resistance can then be corrected by dynamic switching to match the load.

More particularly, there are two different ways of impedance matching that are used together as follows:

1. Measuring the temperatures of the source and the ambient (or temperature of two sources), calculating the internal resistance for each moment and feeding it forward to the DC-DC converter to vary its input impedance to be matched with the output impedance of the TEG.

2. Changing the internal resistance and voltage of the TEG by internal commutations in the TEG using the calculated results.

The second way of impedance matching may use a modular TEG design that includes commutation switches and corresponding control. Such impedance matching may be designed into an on-chip implementation but may be more challenging in the case of separate components.

A water pipe with flowing water is a readily available source to provide a temperature gradient with the atmosphere, so that a TEG or arrangement made of TEGS may be connected between a fluid pipe and the ambient air in order to generate power for a device.

The present embodiments are now considered in greater detail. In general, different agents such as liquids and gases vary their temperature under the same conditions at different times due to a difference in thermodynamic properties such as thermal capacity and heat exchange properties and, thus the temperature gradient varies on the boundary of such media and heat flows from the agent with higher temperature to another with lower temperature. The direction of the flow often varies during the daylight cycle, but the heat flow always exists.

A good example is a pipe with flowing liquid, the pipe surrounded by air. The temperature of the liquid inside the pipe is normally different from the air. Thus, due to the temperature difference, heat-flow occurs between one agent and the other through the pipe walls. Using the present embodiments, the heat can be partially harvested using devices for direct energy conversion. The thermoelectric generator (TEG) is a device that permits direct conversion of thermal energy to electrical energy.

Reference is now made to FIGS. 10a-b, which illustrate a thermoelectric generator module 100 comprising ceramic plates 102 and 104 separated by paired semiconductor pellets 104. More particularly, the plates may be separated with pellets of dissimilar thermoelectric materials of P- and N-types. The copper conductors connect the pellets in series keeping p-n junctions at one side and n-p junctions at another.

FIG. 10a is a cutaway diagram showing internal detail, and FIG. 10b is an actual view of such a component. The module is placed across a temperature gradient so that one of the plates forms a warm side and the other forms a cold side.

Reference is now made to FIG. 11, which illustrates a thermoelectric generator module connected over a temperature gradient between water pipes and ambient air according to an embodiment of the present invention. Aluminium block 110 is shown in cross-section and includes embedded pipes 112, 114 and 116 each carrying water.

The quantity $q_c$ indicates heat that flows from the water to the ambient air via TEG module 118 and a heat-sink 120 ($\Theta_k$). The 40×40 mm² TEG module 118 separates between the hot temperature $T_h$ and the cold temperature $T_c$, and includes 127 individual thermocouples.

Reference is now made to FIG. 12, which illustrates a simulation scheme for the embodiment of FIG. 11. As will be explained in greater detail below a method of electro-thermal analogies is used. Central block 130 is an electro-thermal model of the 127 couple TEG module 40×40 mm² TEG 118. Cold plate 132 modeling the aluminum block cooled by water, 110, is represented as a temperature source $T_{cc}$. The ambient air $T_{amb}$ is represented by voltage source 134. The TEG is shown as a block 130. The equivalent tri-port electric circuit model of the block is discussed in FIG. 24 below.

FIG. 13a is a simplified graph illustrating results from an $R_L$ (load resistance) sweep of the model depicted in FIG. 12. The Power/Voltage curves are shown over load ranges for 5° C. temperature difference, between the air and the heat source. There are four V-I and P-I curves for different values of dT and results are correspond with Table I. FIG. 13b shows a simulation of voltage and power against current for different temperatures.

TABLE I

Preliminary results of experimental measuring Power generated by system of FIG. 11.

| ΔT (water/air), ° C. | R, Ω | $V_{out}$, mV | P, mW |
|---|---|---|---|
| 3 | 3 | 46 | 0.64 |
| 4 | 3 | 60 | 1.08 |

In the following discussion, both full and simplified analysis of the electrical generating system consisting of a TEG, a heat source and a heat sink is presented.

For ease of understanding the system is represented as an active two-terminal system which includes a voltage source and a non-linear temperature dependent resistor. The role of heat removal in the system and its influence on the values of the output parameters is shown.

Thermoelectric Generators (TEGs) have been occupying a stable niche in the energy market for decades. TEG is not the most efficient of generators, but it is usable in conditions where other sources cannot be used. For example, it is used in generators for space applications or as an autonomous power source at ocean depths. The range of sources of thermal energy for the necessary temperature gradient is very wide, and includes radioisotopes, fuel combustion systems, boilers, solar energy and the like.

The use of TEGs for harvesting of waste heat has increased significantly in recent years, for instance, to harvest heat from exhaust systems. Many gadgets that use waste heat for charging phones, laptops, etc. have appeared on the market, and lighting devices powered by harvested heat have been reintroduced (after a brief vogue in the 1960s).

But a new factor making the TEGs attain a second wave of popularity, is the appearance of new micro-power electronic systems that require a reliable low-power supply and can be placed anywhere including hard-to-reach places, even inside the human body. The latest technologies open new opportunities to implement the generator directly on the chip, opening up the possibility of creating new kinds of devices such as battery-less implantable sensors, or a chip that does not need a power source at all, but rather has an integrated TEG, and can thus rely on a small temperature gradient.

Thermoelectric generating systems have been discussed in detail in the literature of the early 1960's. However, at that time the emphasis was on powerful generators and strong heat fluxes. Authors argued that the thermal resistance of equipment should be less than the proper thermal resistance of the generator.

Otherwise, their use is impractical, and modern TEG-based harvesters require accurate optimization to waste as little energy as possible. Such small-sized generators operate with low temperature gradients, have large thermal resistances of heat exchangers and require special high-tech thermal and thermoelectric materials, sophisticated highly efficient step-up converters, and systems that optimize the load.

In the following, an analysis is provided of the thermoelectric system. A key role in the analysis is assigned to the influence of such factors as an ambient temperature conditions and a thermal path on the generator's emf and its equivalent electrical resistance.

The present embodiments may provide a method that allows:
  to predict the power available from the known temperature gradient;
  to avoid using maximum power point tracking (MPPT) systems, wherever possible, to save the harvested energy;
  to reduce settling time of the MPPT algorithm if it is used;
  to optimize the thermal path so as to get the maximum possible energy; and
  to choose the right TEG for the specific temperature gradient and the given heat removal.

Theoretical Background

As discussed above, there are five main processes taking place in a thermoelectric generator. The processes are: Seebeck power generation, Peltier cooling/heating, Fourier heat transfer, Joule heating due to heat dissipation on resistive components, and Thompson's electro-thermal process. The last process is normally negligible because its impact is less than 10% of all others. The following only deals with steady-state analysis.

Reference is now made to FIG. 14, which is a simplified schematic diagram illustrating a conventional thermoelectric system 140 comprising a heat source 142, a TEG 144, and a heat sink 146. Alongside the system is an equivalent circuit visualization 148 of heat flow between the temperature Ts of the heat source and the ambient temperature Tamb at steady state conditions.

The system is modelled as three resistors in series 150, 152 and 154, sandwiched between voltage sources 156 and 158. The sources are analogous to temperatures of the heat source Ts and the ambient air temperature Tamb correspondently. The equivalent circuit model below does include capacitors Cs and Ck that represent the thermal masses of the source and the heatsink and shows that all the processes have transients and a significant settling time, which may sometimes be about half an hour. The visualization shows the heat flow and thus distribution of temperature in-between the two known temperatures of the ambient air $T_{amb}$ and of the heat source $T_s$ using the equivalent electrical circuit.

The method of equivalent circuit modelling is very popular in engineering. The temperatures $T_{s/h/c/amb}$ are shown as electrical potentials, relative to a common point; the heat flows $q_{h/c/k/ph/pc/j}$ are shown as electrical currents. The nodes represent the surfaces, and the resistances $\Theta_{s/k/m}$ represent the thermal resistance of the heat source/heatsink/TEG.

The system converts thermal energy directly into electricity using solid-state technology based on the so-called Seebeck effect (thermoelectric effect). A thermoelectric power converter has no moving parts, and is compact, quiet, highly reliable and environment-friendly.

A useful expression to describe a thermoelectric generator is the expression of its voltage drop between terminals:

$$V = \alpha_m (T_h - T_c) - IR_m, \quad (1)$$

where $\alpha_m$ is the Seebeck coefficient of the thermoelectric module. The $R_m$ is the electrical resistance of the p and n pellets of the TEG connected in series by means of the copper connectors, normally known as the internal or ohmic resistance of the TEG, and current I is a steady-state electrical current.

Unfortunately, the thermal difference (Th–Tc) is usually unknown. Thus Th and Tc can be expressed (see FIG. 14) as:

$$Tc = Tamb + qc\Theta k \quad (2)$$

$$Th = Ts - qh\Theta s, \quad (3)$$

Reference is now made to FIG. 15, which illustrates the TEG as a homogeneous solid body 160 having heat conductivity in one dimension only, from hot 162 to cold 164 surfaces. The amount of heat flowing through the body due to Fourier heat transfer ($q_k$) is proportional to the temperature gradient. The body bears internal heat sources ($q_j$) due to power losses on the internal resistance of the generator (Joule heating). Finally, the Peltier thermoelectric heat ($q_{pc}$ and $q_{ph}$) is generated and released at the cold and hot surfaces correspondently.

That is to say, FIG. 15 schematically depicts the thermal processes taking place in the TEG. We assume that the heat flows through the thermoelectric module in one dimension only. This is due to the special structure of the TEG that consists of a plurality of pellets thermally isolated from each other. The heat propagates from the hot surface of the TEG toward its cold surface along the pellets and it is almost unable to spread transversely along the main direction of the temperature gradient. This assumption allows us to operate with equivalent parameters for the TEG.

As can be derived from FIG. 15, two equations may describe an energy balance on hot and cold surfaces of the TEG as follows:

$$q_h = q_k + q_{ph} - \frac{q_j}{2} = (T_h - T_c)/\Theta_m + \alpha_m I T_h - \frac{I^2 R_m}{2}, \quad (4)$$

$$q_c = q_c + q_{pc} + \frac{q_j}{2} = (T_h - T_c)/\Theta_m + \alpha_m I T_c + \frac{I^2 R_m}{2}, \quad (5)$$

Reference is now made to FIG. 16, which shows an equivalent circuit of the TEG for both thermal and electrical domains, corresponding to expressions (4)-(5).

FIG. 16 shows schematic representations of the expressions (4)-(5) by equivalent circuit. Ambient temperature and the temperature of the heat source are represented as voltage sources $T_{amb}$ and $T_s$. $\varphi_1$ and $\varphi_2$ are electrical potentials of the terminals 1 and 2 relative to the common ground point. The thermal masses of the source and the heat sink are shown schematically as capacitors $C_{k/s}$.

This equivalent circuit helps us to produce different topologies of equivalent circuit model: a. the tri-port equivalent circuit model shown in FIG. 24. The three ports of the model are two thermal ports, $T_h$ relative to absolute zero temperature, $T_c$ relative to absolute zero temperature, and an electrical port.

This circuit most suitable for simultaneous simulation of thermal and electrical processes, b. sectional equivalent circuit model for planar TEGs, where p and n legs operate in assimilate thermal conditions see FIG. 23, and c. the two port equivalent circuit, depicted in FIG. 17.

In the most typical case the thermal conduction resistance $\Theta_S$ at the source side is much smaller than the convective thermal resistance $\Theta_K$ of the ambient air side. So herein, the thermal resistance $\Theta_S$ is negligible relative to that of the heatsink. Thus the temperature drop on the $\Theta_S$ is negligible and the temperature $T_1$ can be assumed to be equal to $T_S$ for simplicity of expressions. The output voltage can be solved from (4)-(5) as:

$$V = \frac{I \cdot \left(1 + h \cdot \left(\left(1 + t \cdot \frac{\alpha_m^2 \cdot \Theta_m}{R_m} \cdot T_{amb}\right) - \frac{I \cdot \alpha_m \cdot \Theta_m}{2}\right)\right) \cdot R_m - \alpha_m \cdot (t-1) \cdot T_{amb}}{h \cdot (I \cdot \alpha_m \cdot \Theta_m - 1) - 1} \quad (6)$$

where $$h = \frac{\theta_k}{\theta_m} \text{ and } t = \frac{T_1}{T_{amb}}$$

Equation (6) describes the output voltage on the terminals of the TEG in a non-linear way. At the same time researchers and engineers working in the field repeatedly pointed out that the I-V characteristics of the TEG-radiator-system are in fact very close to linear. This point is also confirmed by the experiments described hereinbelow. Therefore, it is appropriate to use a Maclaurin series to extract the linear terms and separate them from the non-linear ones of (6).

The first n terms of the Maclaurin series of (6) are as follows:

$$V(n) = \alpha_m \cdot \frac{(t-1)}{h+1} \cdot T_{amb} - I \cdot \frac{R_m}{2} \cdot \left(1 + \left(2 \cdot Z \cdot T_{amb} \frac{(ht+1) \cdot h}{(h+1)^2} + 1\right) \cdot \sum_{j=0}^{n-1} \left(\frac{h}{h+1} \cdot I \cdot \alpha_m \cdot \Theta_m\right)^j\right) \quad (7)$$

Where Z is a figure of merit of the thermoelectric materials of the generator, $$Z = \frac{\alpha \cdot k}{\rho} = \frac{\alpha_m^2 \cdot \Theta_m}{R_m}, \quad (8)$$

The output voltage of the generator (7) can be rewritten in the Thévenin's form of open circuit voltage $V_{th}$ and internal resistance $R_{th}$:

$$V = V_{th} - I \cdot R_{th}, \quad (9)$$

Where:

$$V_{th} = \frac{(t-1)}{h+1} \cdot \alpha_m \cdot T_{amb}, \quad (10)$$

And $$R_{th}(n) = \frac{R_m}{2} + R_m \cdot \left(Z \cdot T_{amb} \frac{(ht+1) \cdot h}{(h+1)^2} + \frac{1}{2}\right) \cdot \sum_{j=0}^{n-1} \left(\frac{h}{h+1} \cdot I \cdot \alpha_m \cdot \Theta_m\right)^j. \quad (11)$$

Reference is now made to FIG. 17, which illustrates a two-terminal Thévenin-type equivalent circuit of the TEG with equipment. Note the $R_{th}$ is current and temperature dependent non-linear element.

Equation (9) is actually the expression of the Thévenin equivalent circuit shown in FIG. 17. Terms of the equations (7) and (11) with index higher than one, take non-negligible values only when values of dimensionless group: $I \cdot \alpha_m \cdot \theta_m$ are high enough. For modern thermoelectric materials this happens for $\Delta T$ about of 100K. Since we consider thermo generators for low temperature gradients, in our case, the $\Sigma$-components for n>1 are negligible and the only n=1 term of the series may be a good approximation.

Reference is now made to FIGS. 18a and 18b, which show examples of V-I (a) and P-I (b) curves for a specific TEG TB-127-1,4-1,2 produced by Kryotherm™. The I-V (a) and P-V (b) curves of the thermo-generating system show the heatsink with $\Theta_k$=1.1 K/W, $T_{amb}$=300K, and $T_1$=390K. Solid line 180 corresponds to simulation of a full model, the dotted line 182 corresponds to a proposed model with $R_{th}(2)$, and the dot-dashed line 184 corresponds to a proposed model with $R_{th}(1)$. In the present example, $\Delta T$ is 90 K.

One can see that the short-circuited current error is less than 3%. At the maximum power point the error may be even smaller.

It follows from the above that for low temperature gradients a linear temperature-dependent resistor may be a good approximation. This resistance may be obtained from (11) in the case of n=1, where only the first term of the Maclaurin series is employed:

$$R_{th}(1) = R_m \cdot \left(1 + \frac{h \cdot (h \cdot t + 1)}{(h+1)^2} \cdot Z \cdot T_{amb}\right) \quad (12)$$

Maximization of Output Power

Equations (10) and (12) enable predicting the maximum available power and the optimal load for specific thermoelectric system under known temperatures. In the case of a matched load, the maximum possible power is reached, and in the case of a model with $R_{th}(1)$, $$P_{max} \approx \frac{v_{th}^2}{R_{th}(1)} = \frac{Z}{\Theta_m} \frac{(t-1)^2 T_{amb}^2}{(4(1+h)^2 + 4h(1+ht)T_{amb}Z)} \quad (13)$$

It is obvious that the smaller the h, the higher is the value of the power.

The total available heat flux, which could provide the radiator with known applied temperature difference, when connected to the heat source directly, bypassing the generator can be calculated as follows:

$$q^* = \frac{\Delta T}{\Theta_k}, [W] \quad (14)$$

Thus, the best heatsink is the one with the smallest thermal resistance and which provides the highest value of the heat flow. However, the best heatsinks are large and expensive. Sometimes the properties of the heatsink are the main limiting factor in designing a thermoelectric system. However, each manufacturer of thermoelectric coolers/generators offers a wide range of products. The problem of a designer is, among other things, to select the TEG that provides maximum power output.

How to Choose the Optimal TEG

Since the maximum power on the load corresponds to load resistance equal to $R_{th}(n)$ from (11), one can express the power (13) as a function of $\Theta_m$ and $\Theta_k$.

Setting the derivative $$\frac{dP_{max}}{d\Theta_m} = 0$$

having $$h = \frac{\Theta_k}{\Theta_m} \text{ and } t = \frac{T_1}{T_{amb}}$$

substituted, the value of the optimal $\Theta_m$ and h can be calculated as $$\Theta_{mopt} = \Theta_k \sqrt{1 + ZT_1} \Rightarrow h_{opt} = \frac{1}{\sqrt{1 + ZT_1}} \quad (15)$$

The TEG that meets the above condition will produce the most power for a given heat sink.

In this case, the TEG and the heatsink are matched as $h_{opt}$ from (14), and the maximum available power that one can harvest from the given temperature gradient and given heatsink can be calculated as part of a total heat flux:

$$P_{max} = 4 \cdot \left(2 \cdot \left(1 + \sqrt{1 + \Delta T \cdot Z + T_{amb} \cdot Z}\right) + T_{amb} \cdot Z\right)^{q^*} \frac{\Delta T \cdot Z}{} \quad (16)$$

EXAMPLE

The best available heatsink has a thermal coefficient of 1.15 K/W. The estimated temperature difference $\Delta T$ is 25K, the ambient temperature is about 300K.

The dimensions of the TEG are 40 mm×40 mm. The goal of the example is to choose that TEG from the manufacturer's stock which provides maximum possible power under given conditions. Here is an example of choosing the best TEG for the purpose:

For low temperature gradients, the Peltier thermoelectric cooler can be used as a TEGs. For this specific example we will choose a TEG from the stock of coolers manufactured by Kryotherm. The manufacturer offers $\Delta T_{max}$, $I_{max}$, and $V_{max}$ parameters of the products.

To extract the parameters of the TEG ($\alpha_m$, $\theta_m$, $R_m$) from the manufacturer's data, above expressions can be used. Thus, for a number of coolers having desired dimensions, we can build Table II.

TABLE II

Data provided by manufacturer and extracted parameters for 40 mm × 40 mm modules.

| | $\Delta T_{max}$, K | $I_{max}$, A | $V_{max}$, V | $R_m$, Ω | $\Theta_m$, K W$^{-1}$ | $\alpha_m$ VK$^{-1}$ | Z, K$^{-1}$ |
|---|---|---|---|---|---|---|---|
| DRIFT-0, 8 | 69 | 11.3 | 24.6 | 1.68 | 0.64 | 0.082 | 0.0026 |
| DRIFT-1, 05 | 69 | 8.6 | 24.6 | 2.20 | 0.85 | 0.082 | 0.0026 |
| DRIFT-1, 15 | 69 | 7.9 | 24.6 | 2.40 | 0.92 | 0.082 | 0.0026 |
| DRIFT-1, 2 | 69 | 7.6 | 24.6 | 2.49 | 0.96 | 0.082 | 0.0026 |
| DRIFT-1, 5 | 70 | 6.1 | 24.9 | 3.13 | 1.20 | 0.083 | 0.0026 |
| TB-127-1, 4-1, 05 | 69 | 8.6 | 15.7 | 1.40 | 1.33 | 0.052 | 0.0026 |
| ICE-71 | 71 | 8 | 16.1 | 1.54 | 1.44 | 0.053 | 0.0027 |
| TB-127-1, 4-1, 15 | 69 | 7.9 | 15.7 | 1.53 | 1.44 | 0.052 | 0.0026 |
| TB-127-1, 4-1, 2 | 70 | 7.6 | 15.9 | 1.60 | 1.51 | 0.053 | 0.0026 |
| TB-125-1, 4-1, 15CH | 69 | 7.9 | 15.5 | 1.51 | 1.46 | 0.052 | 0.0026 |
| TB-119-1, 4-1, 15CH | 69 | 7.9 | 14.7 | 1.43 | 1.54 | 0.049 | 0.0026 |
| TB-71-2, 0-1, 5 | 70 | 12.4 | 8.9 | 0.55 | 1.65 | 0.0297 | 0.0026 |
| FROST-72 | 72 | 6.2 | 16.3 | 2.00 | 1.87 | 0.054 | 0.0028 |
| FROST-71 | 71 | 6.1 | 16.1 | 2.01 | 1.89 | 0.054 | 0.0027 |
| TB-127-1, 4-1, 5 | 70 | 6.1 | 15.9 | 2.00 | 1.88 | 0.053 | 0.0026 |
| TB-125-1, 4-1, 5CH | 70 | 6.1 | 15.7 | 1.97 | 1.91 | 0.052 | 0.0026 |
| TB-119-1, 4-1, 5CH | 70 | 6.1 | 14.9 | 1.87 | 2.01 | 0.0497 | 0.0026 |
| CHILL | 69 | 5.8 | 15.7 | 2.08 | 1.97 | 0.0523 | 0.0026 |
| TB-71-2, 0-2, 5 | 72 | 7.6 | 9.1 | 0.91 | 2.74 | 0.03 | 0.0028 |
| TB-127-1, 4-2, 5 | 72 | 3.7 | 16.3 | 3.35 | 3.14 | 0.054 | 0.0028 |
| STORM-71 | 71 | 3.6 | 16.1 | 3.41 | 3.21 | 0.054 | 0.0027 |
| TB-119-1, 4-2, 5CH | 72 | 3.7 | 15.3 | 3.14 | 3.35 | 0.051 | 0.0028 |
| STORM | 69 | 3.6 | 15.7 | 3.36 | 3.17 | 0.05 | 0.0026 |

It can be shown that the parameter $\Delta T_{max}$ depends on the figure of merit Z of the thermoelectric materials. By viewing the entire assortment of coolers in Table II we can verify that in all of them the value of $\Delta T_{max}$ is approximately the same, and the Z of coolers is also more or less same (about 0.0027 K$^{-1}$). This means that the only parameter that we have to choose is the thermal resistance of the module.

In Table II, the best generator will have the highest value of Z and a thermal resistance as close to $1.15 \cdot \sqrt{1+Z \cdot T_1}$ as possible.

$T_1$ can be found from $T_{amb}$ and $\Delta T$. In this example $T_1$ is 325K.

Thus the TEG we have to choose is one with $\Theta_m \approx 1.52$ K/W, and the best candidate is TB-127-1,4-1,2.

FIGS. 19a-b illustrate theoretical characteristic V-I and P-I curves of TB-127-1,4-1,2 (solid line), TB-119-1,4-1,15 (dashed line), and TB-127-1,4.-2,5 (dash-dotted line) are shown in plots (a) and (b) respectively. FIGS. 19a-b show the V-I and P-I characteristics of the selected module, together characteristics of two others, (TB-119-1,4-1,15 and TB-127-1,4.-2,5) whose thermal resistance is different from the optimal one in greater party and in the smaller party respectively. It is clear from the figure that the maximum power available from the selected TEG is higher than maximum power of other TEGs. This result, in addition to what was argued above, may be experimentally confirmed in the following.

Experimental Results:

To confirm the proposed method, laboratory tests were carried out using the setup of FIGS. 21 and 22. I-V characteristics of some types of generators were constructed for steady-state operation.

FIG. 21 illustrates an exploded view, and FIG. 22 illustrates the control and measurement scheme.

The experimental setup allows setting and controlling of the temperature of the heat source and the heat exchange coefficient of the heatsink by controlling the speed of revolution of the fan. The controllable load permits measure current and voltage of the TEG for any load and allows building of the V-I curve of the generator for different values of heatsink heat-exchange coefficient and different temperature gradients between the heat source and the ambient air. Some of results are tabulated in Table III.

The examples of experimentally measured curves. (a) I-V curves of the TB-127-1,4-2,5 for given $\Delta T$ and $T_{amb}$ and variable values of the thermal resistance of the heatsink. (b) I-V curves for known $\Delta T$, $T_{amb}$, and $\Theta_{ca}$, for different TEGs, and (c) P-I curves for known $\Delta T$, $T_{amb}$, and $\Theta_{ca}$ for different TEGs.

TABLE III

Comparison of measured and predicted results

| Module | $\Theta_{ca}$, K/W | $\Delta T$, K | $T_{amb}$, ° C. | $V_{th}$, V predicted | $V_{th}$, V measured | $R_{th}$, Ω predicted | $R_{th}$, Ω measured |
|---|---|---|---|---|---|---|---|
| TB-127-1, 4-2, 5 | 2.1 | 25 | 23.7 | 0.81 | 0.8 | 4.47 | 4.78 |
| TB-127-1, 4-2, 5 | 0.36 | 25 | 23.7 | 1.2 | 1.28 | 3.63 | 4.15 |
| TB-127-1, 4-2, 5 | 1.13 | 25 | 23.7 | 0.99 | 1.02 | 4.08 | 4.6 |
| TB-127-1, 4-1, 2 | 1.13 | 25 | 23.7 | 0.758 | 0.77 | 2.16 | 2.59 |
| TB-127-1, 4-1, 15 | 1.13 | 25 | 23.7 | 0.92 | 0.912 | 3.46 | 3.93 |

The experimental test almost supports the theoretical analysis. The error in equivalent resistance ($R_{th}$) is result of temperature dependence of the thermoelectric parameters. The average temperature of the module increases with load current increment. Thus the internal resistance $R_m$ increases together with other thermoelectric parameters. As result, the measured equivalent resistance is higher than the predicted one.

The present method allows analyzing a system for harvesting of thermal energy, consisting of a thermoelectric generator and heat removal, by modelling the system as a Thevenin-type two-pole that includes voltage source and internal resistance. Numerical values of both the voltage source and the internal resistance can be calculated by expressions derived above. Calculating these values requires data on the thermoelectric generator as well as on the heat sink.

The present approach enables predicting of the power available from the known temperature gradient, to optimize the thermal path so as to get the maximum possible energy, to choose the right TEG for the specific temperature gradient and the given heat removal.

In addition, the method can be used for maximum power point tracking without direct measurements of currents and voltages. The most common methods of tracking the maximum power point are based on the measurement of open circuit voltage using the fractional open circuit voltage algorithm, or short-circuit current using the fractional short-circuit current algorithm. Neither of these methods is applicable to thermoelectric generators due to the large thermal mass involved in the transition process.

These thermal masses are depicted as capacitors in the equivalent circuit in FIG. 14. Changing the temperature of a massive body takes considerable time. The settling time is often greater than a minute and sometimes reaches an hour. It is obvious that stopping the harvesting process for such a long time inevitably leads to loss of energy. If complete steady state is not reached however, the measurement of no-load voltage or short circuit current is not accurate.

The present method allows determining the internal resistance of the generator without resorting to direct measurement. Continuous measurement of the temperature of the heat source and the ambient air temperature give all the data required to calculate and to correct the load so that it is always matched to the internal resistance of the generator.

This value can be calculated using equation (12). The present method thus helps to avoid using MPPT systems wherever possible, to save the harvested energy. In cases where MMPT is still necessary, the method may be helpful in reducing the settling time of the MPPT algorithm.

Reference is now made to FIG. 23, which is a simplified diagram illustrating an equivalent electrical circuit of a single-couple planar TEG. Bold-blue lines 320 indicate the thermal part of the model. The continuous non-bold red lines 322 indicate the electrical part of the model.

FIG. 23 depicts the single couple planar-TEG model, represented by the original topology of the equivalent electrical circuit that can be used for simulation of the VLSI and MEMS on-chip thermoelectric modules. The model may be based on known technology and geometry. In this circuit, all bold elements correspond to thermal elements. This is achieved by using an electrical analogy to the thermal network. The electrical resistances represent the thermal resistances (K) of the TEG elements, voltages represent temperatures (T), and currents represent the heat flows (q) in the system.

A current source in the thermal part of the circuit means that energy is accepted or released at a given point of the TEG. Capacitors in this portion of the model are equivalent to thermal masses (heat capacities) of the elements (C). The non-bold components of the model represent the electrical components of the thermo-electrical system.

Ordinary electrical resistors in FIG. 23 are symbolized by R. The sub1, sub0, p, n, vm and hx subscripts associate the relevant parameter (R, C or K) depicted in FIG. 23 with sub1, sub0, p-leg, n-leg, contact, to give an equivalent representation for the vias and metal layers in the thermal path and with the heat exchanger, respectively. $K_{hx}$ may be assumed to be zero in the ideal case, when both the temperatures of the hot and cold surfaces are known. In a more realistic case, the temperature of the hot surface is known, but the temperature of the cold surface is to be calculated using the ambient air temperature and the heat exchanger coefficient $K_{hx}$.

In accordance with the Seebeck effect, when two ends of a wire (conductors or semiconductors) are held at a temperature difference $\Delta T_w$, an electromotive force $V_{emf}$ can be observed.

The coefficient of proportionality $\alpha_w = V_{emf}/\Delta T_w$ is the Seebeck coefficient. The sign of the Seebeck coefficient of a p-type material is positive and of an n-type material is negative, representing the electrical potential of the cold side with respect to the hot side. The total Seebeck coefficient of the single-TEG is $\alpha = \alpha_p - \alpha_n$, where $\alpha_p$ and $\alpha_n$ are the Seebeck coefficients of the p-type and n-type thermoelectric leg materials. The electrical part of the equivalent circuit shown in FIG. 23 represents the Seebeck effect as a pair of oppositely signed voltage sources for each one of the junctions. Each one of the sources is equal to the temperature of the junction multiplied by the Seebeck coefficient of the corresponding material. Note that the Seebeck coefficient of the connecting materials is assumed to be zero. Thus, for $T_{hn}=T_{hp}=T_h$, the value of the open circuit voltage $V_{s\_oc}$ of the single-TEG (which is also equal to its electromotive force $V_{s\_emf}$ is:

$$V_{s\_oc} = \alpha_p T_h - \alpha_p T_c + \alpha_p T_c - \alpha_n T_h =$$

$$= (\alpha_p - \alpha_n)(T_h - T_c) = \alpha \cdot \Delta Tg \quad (23)$$

where $\Delta T_g = T_h - T_c$ is a temperature gradient between the hot and cold junctions of the generator and termed the "effective temperature difference". In the case where the single-TEG is loaded, an electrical current Is flows through the load; thus the I-V characteristic of the single-TEG is obtained by $V_{out} = \alpha \cdot \Delta T_g - I_s \cdot R_s$ as noted in (1), while the total electrical resistance of the single-TEG is equal to $R_s = R_p + R_n + R_{vm}$.

Unfortunately, as discussed above, the values of $T_h$ and $T_c$ (and consequently $\Delta T_g$) are unknown, due to the fact that those temperatures are in the internal layers of the chip. Thus, to calculate the values of the temperatures of the hot and cold junctions (and to obtain $\Delta T_g$), the whole thermal path of the chip is modelled, as in FIG. 23 considering additional processes that occur simultaneously to the Seebeck effect. These additional processes are reflected in the thermal part of the equivalent circuit as depicted in FIG. 23 and the following adds to what was explained above.

Fourier Heat Transfer:

the conductive heat transfer between the hot and cold sides of each one of the elements. This process is emulated by the presence of the thermal resistances of each element. The heat flow through the element is proportional to the temperature difference over the thermal resistance ($q_k=:\Delta T/K$), analogous to Ohm's Law.

Joule Heating:

generation of volumetric heating due to electrical flow I through the electrical resistances of the element, shown in the equivalent circuit as a heat source of a value given by the current squared times the resistance ($q_j=I^2 \cdot R$). In the case of the legs of the TEG, the Joule heat is assumed to be equally distributed between the left and right halves of the thermal legs.

Peltier Effect:

when a current passes through a wire, thermal energy is carried by the current, so that the temperature of one end, or junction, of the wire decreases and the other increases. The quantity of the heat flow is proportional to the current passing through the junction $q_p=\pi \cdot I$ ($\pi$ is the Peltier coefficient). The use of the Thomson relation ($\pi=\alpha_w \cdot \Delta T_w$) leads to the representation of the Peltier heat flow by $q_p=\alpha_w \cdot \Delta T_w \cdot I$. In FIG. 23 the Peltier effect is emulated by equivalent current sources $I_s \cdot v_{1/2/3/4}$, while $v_{1/2/3/4}$ are determined by the Seebeck effect ($\alpha_{p/n} \cdot T_{h/c}$).

The positive heat flow means heating and the negative heat flow means cooling. Note that the proper direction of each of the Peltier heat sources in FIG. 23 is taken into account by the sign of the electrical current direction relative to the polarity of the corresponding voltage source $v_{1/2/3/4}$, which polarity is also dependent on its Seebeck coefficient sign. A positive electrical current sign is considered to represent the current entering into a positive terminal of the voltage source (i.e. electrical energy is absorbed and thermal energy is emitted), and the reverse in the opposite case. Each of the junctions can be expressed mathematically by $q_{pj}=\alpha_p \cdot T_j \cdot I - \alpha_n \cdot T_j \cdot I = \alpha \cdot T_j \cdot I$, while $T_j$ is the temperature of the corresponding junction ($T_h$ or $T_c$).

Thomson Effect:

the Thomson effect is described by the Thomson coefficient, which relates the Peltier and Seebeck phenomena for the case of a temperature dependent $\alpha$. However, this effect is reported in the literature to be small and is neglected. The proposed model permits to take into account the Thomson effect when the Seebeck coefficient is a function of temperature.

Transient Processes:

the thermoelectric processes work immediately, but heating the elements up to the steady-state condition is a transient process. The transition time to steady state depends on thermal masses and thermal resistances, represented in FIG. 23 by the electrical capacitors and resistors of the corresponding elements. Herein, the mass of each leg is divided amongst y-sub-masses of equal heat capacity (in an equivalent form to y- RC-networks). The bigger the number y, the better the precision of the transient simulation. After checking different values of y, It was decided that y=2 is a good enough approximation.

The illustrated model of the single-TEG is not just able to follow temperature changes, but, moreover, it is also fully functional during both possible polarities of external temperature differences, due to the direction-dependent Peltier heat sources.

Equivalent On-Chip TEG Model for Replicated TEG Unified Structure

A practical on-chip TEGs may consist of thousands and even hundreds of thousands of single-TEG connected elements. Therefore, in order to model serial and/or parallel unified and non-switchable electrically connected, replicated single-TEGs, it is preferred to avoid the chain of a large number of single-TEG models, due to simulation run time considerations. However, the replicated structure of single-TEGs can be represented by one equivalent model. Considering that the on-chip TEG consists of n serial and in parallel electrical unified structures of multiple single-TEG elements, which are connected thermally in parallel, the equivalent TEG model can be represented by the same topology as proposed in FIG. 23 with the following adjustments (achieved by the use of basic electrical circuit principles). The values of the equivalent electrical resistances of the p-legs, n-legs and of the contacts would become $(n/m) \cdot R_p$, $(n/m) \cdot R_n$ and $(n/m) \cdot R_{vm}$, respectively.

The value of each of the voltage sources ($v_1, \ldots, V_4$) would be multiplied by n. Assuming that the temperature over each of the single-TEG's hot and cold surfaces is uniform (considering its small dimension), the equivalent thermal resistances of the p-legs, n-legs, contacts, sub1 and sub0 can be represented by $K_p/(n \cdot m)$, $K_n/(n \cdot m)$, $K_{vm}/(n \cdot m)$, $K_{sub1}/(n \cdot m)$ and $K_{sub0}/(n \cdot r)$, respectively. The equivalent heat capacities of the p-legs, n-legs, contacts, sub1 and sub0 become $C_p \cdot (n \cdot m)$, $C_n \cdot (n \cdot m)$, $C_{vm} \cdot (n \cdot m)$, $C_{sub1} \cdot (n \cdot m)$ and $C_{sub0} \cdot (n \cdot m)$, respectively. However, the thermal resistance of the heat exchanger does not have direct dependence on the number of serial and/or parallel single-TEGs. It mostly depends on the case type, the area and many other factors. This extended model type is used herein for characterizing the behavior of the unified structured sub-units.

Derivation of Model Parameters from Standard 180 nm CMOS Process

Parameters for a proposed model may be derived from the properties of the materials used in the thermoelectric generator. The simplified topology of the single-TEG is shown in FIG. 11. The thermal and electrical properties of the corresponding materials are tabulated in TABLE IV.

TABLE IV

Process Layers Properties and Constraints

| Layer | t μm | ρ $\frac{kg}{m^3}$ | λ $\frac{W}{m \cdot K}$ | C $\frac{J}{kg \cdot K}$ | R□ mΩ sq | Rvia Ω contact | α $\frac{\mu V}{K}$ |
|---|---|---|---|---|---|---|---|
| p-leg | 0.2 | 2200 | 31.2 | 100 | 5 | — | 103 |
| n-leg | 0.2 | 2200 | 31.5 | 100 | 6 | — | −57 |
| metal$_{1-4}$ | 0.54 | 2.7n | 180 | 910 | 80 | — | — |
| metal$_5$ | 2 | 2.7n | 180 | 910 | 15 | — | — |
| via$_1$ | 0.47 | 19.3n | 173 | 132 | — | 7 | — |
| via$_{2-4}$ | 0.82 | 19.3n | 173 | 132 | — | 6 | — |
| via$_5$ | 0.8 | 19.3n | 173 | 132 | — | 2.5 | — |
| substrate | 725 | 2330 | 168 | 764 | — | — | — |

The parameters t, ρ, λ, c, $R_\square$, $R_{via}$ *and $\alpha$ represent the thickness of the layer, the volumetric mass density, the thermal conductivity, the specific heat capacity, the electrical sheet resistance, the electrical resistance of the via per its standard contact dimension (each via has its own standard relative dimension) and the Seebeck coefficient of the corresponding material, respectively. λ and c parameters of the aluminium metals and the tungsten vias are characterized by their typical material values. t values of all the layers, $R_\square$, R *, and ρ of the metals and vias layers were available.

Table IV contains parameters with a freedom of choice and determined values of the single-TEG layout. In view of the 4 μm etching window-limit in creating the cavity, the width of thermocouples is selected to be 4 μm to ensure a proper etching process and to enable high single-TEG density.

The number #Vias of parallel positioned conductive vias between each couple of neighbour metal layers is chosen to be the maximal (constrained by the design rules) to reduce the contact's resistances. L and W represent the length and the width of the corresponded layers in TABLE II. L and W of vias were chosen according to their standard values.

TABLE IV

CHOSEN VALUES FOR SINGLE-TEG IMPLEMENTATION

| Layer | L, μm | W, μm | #Vias |
|---|---|---|---|
| p-leg | 71 | 4 | — |
| n-leg | 71 | 4 | — |
| metal$_{1-4}$ | 4 | 4 | — |
| metal$_5$ | 141.5 | 4 | — |
| via$_1$ | 0.22 | 0.22 | 64 |
| via$_{2-4}$ | 0.26 | 0.26 | 64 |
| via$_5$ | 0.36 | 0.36 | 25 |

The cavity dimensions were chosen to be 4 μm depth, 134.25 μm length and 8 μm width (4 μm process constrained etching window limit plus 2 μm from each side). The sub0 length is 2 μm. The required model parameters values can be simply calculated by using the cavity dimensions, the sub0 length and the Table III and Table IV data. The calculated results are demonstrated in Table V. Note that the t, L and W parameters of the materials need to take into account the material orientation in order to be used properly during the calculations. Thus for example the cross section area of the electrical resistance of metal$_1$ is t·W and of its thermal resistance is L·W.

TABLE V

SINGLE-TEG MODULE PARAMETERS

| Layer | Subscript(X) | $K_X, \frac{K}{W}$ | $C_X, \frac{J}{K}$ | $\alpha_X, \frac{\mu V}{K}$ | $R_X, \Omega$ |
|---|---|---|---|---|---|
| p-leg | p | 2.84M | 1.25 · 10$^{-11}$ | 103 | 88.75 |
| n-leg | n | 2.82M | 1.25 · 10$^{-11}$ | −57 | 106.5 |
| contact | vm | 6.36k | 5.66 · 10$^{-21}$ | — | 32m |
| sub0 | sub0 | 1.49k | 114p | — | — |
| sub1 | sub1 | 3.76k | 1.46μ | — | — |

In Table V, $K_X$, $C_X$, $R_X$, and $\alpha_X$ represent the thermal resistance, the heat capacity, the electrical resistance and the Seebeck coefficient, respectively. The subscript X refers to the element that has this property and is used in the equivalent circuit in FIG. 23. Note that the precise estimation of the thermal resistance of the heat. exchanger is difficult. The chosen value that is used for simulations is experimentally validated $K_{hx}$=9 cm$^2$K/W.

As long as the temperature change rate is significantly lower than the control system's response sampling rate, the present model is able to function properly even at ultra-low frequencies, allowing significant reduction of power consumption by using lower frequencies.

To support different load requirements, a suitable architecture modification of the presented ATA design may also facilitate the accumulation of additional electrical energy, simultaneously with the voltage supply. This is made possible by accumulating the electrical energy of the shorted sub-units during the non-minimal cases of ΔTg (instead of shorting them). The accumulated additional energy may support different requirements.

Reference is now made to FIG. 24, which is a schematic diagram showing a simplified model of a TEM in which the thermal resistance Θm and thermal capacitance C of the TEM, as well as the thermal capacitance of attached ceramic plates Cp, are represented as lumped elements. The model shows the equivalent tri-port electric circuit model of the TEG block 130 in FIG. 12.

It is expected that during the life of a patent maturing from this application many relevant TEG constructions and variations will be developed and the scope of the term TEG is intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device for powering at least one electronic device, comprising:

a thermoelectric generator unit comprising thermoelectric couples, the couples for connection across a temperature gradient brought about by different thermal properties of dissimilar materials, which temperature reverses over first and second parts of a diurnal cycle, said thermoelectric generator unit configured to produce a current due to said temperature gradient, said current reversing with said reversing of said temperature;

the device configured with feed forward maximum power point tracking control of said thermoelectric generator unit to account for changing temperature conditions, and feed back maximum power point tracking control of said thermoelectric generator unit, to correct errors in said feed forward maximum power point tracking control and to find an exact power point by maximization of an output power, said feedforward and feedback combining to provide power generation from said current reversing over said two parts of said diurnal cycle, the device thereby being controllable, via said feed forward and feed back maximum power point tracking, to extract said electrical energy over both of said two parts of said cycle.

2. The device of claim 1, wherein the feed forward control is based on a steady state electricity generation model.

3. The device of claim 1, wherein said feed forward and feedback control is configured to govern a current voltage characteristic of an array of said thermoelectric generator units during a course of power generation.

4. The device of claim 3, wherein said controller is configured to correct for variations in internal resistance in said generator and provide impedance matching for a load.

5. The device of claim 1, further comprising an energy storage unit configured to accumulate energy, thereby to allow powering of devices requiring short bursts of high power.

6. The device of claim 1, wherein said at least one unit comprises a plurality of thermoelectric generator elements, each element comprising a thermoelectric couple, said elements not being individually switchable.

7. The device of claim 1, wherein said feed forward control is based on a static model and said feed back control corrects for errors in said static model based on system dynamics.

8. The device of claim 1 when fitted between two locations having different thermal properties, thereby to extract energy from a source acting on said two locations.

9. A method of powering at least one electronic device comprising:
attaching to said electronic device a TEG unit;
arranging said TEG unit across a temperature gradient that reverses over first and second parts of a diurnal cycle, said TEG unit providing a current that reverses with said temperature gradient;
using a combination of feed forward maximum power point tracking and feed back maximum power point tracking control on said current that reverses to produce an electrical output for said autonomous device based on said temperature gradient over both said first and second parts of said diurnal cycle.

10. The method of claim 9, wherein said combining comprises:
detecting a reversal in said temperature gradient;
reconfiguring said feed forward control to reflect said reversal; and
correcting said feed forward control using said feed back control.

* * * * *